United States Patent
Brouwer et al.

(10) Patent No.: US 7,721,814 B2
(45) Date of Patent: May 25, 2010

(54) METHOD AND APPARATUS FOR HARVESTING AND PICKING UP SOD

(75) Inventors: Gerardus J. Brouwer, Keswick (CA); Robert Milwain, Keswick (CA)

(73) Assignee: 1045929 Ontario Limited, Keswick (CA)

( * ) Notice: Subject to any disclaimer, the term of this patent is extended or adjusted under 35 U.S.C. 154(b) by 1122 days.

(21) Appl. No.: 11/345,301

(22) Filed: Feb. 2, 2006

(65) Prior Publication Data
US 2006/0185860 A1    Aug. 24, 2006

Related U.S. Application Data

(60) Provisional application No. 60/649,639, filed on Feb. 4, 2005, provisional application No. 60/663,246, filed on Mar. 21, 2005, provisional application No. 60/715,135, filed on Sep. 9, 2005, provisional application No. 60/758,195, filed on Jan. 12, 2006.

(51) Int. Cl.
*A01B 45/04* (2006.01)

(52) U.S. Cl. ......................................... 172/20

(58) Field of Classification Search ................... 172/19, 172/20, 33, 36; 414/789.7, 911; 280/455.1, 280/457, 789, 442, 443
See application file for complete search history.

(56) References Cited

U.S. PATENT DOCUMENTS

| | | | |
|---|---|---|---|
| 3,887,013 A | 6/1975 | Helberg | |
| 3,935,904 A | 2/1976 | Beck | |
| 4,294,316 A | 10/1981 | Hedley et al. | |
| 5,626,195 A * | 5/1997 | Dover | 172/19 |
| 5,857,527 A | 1/1999 | Van Vuuren | |
| 6,659,189 B2 * | 12/2003 | Woerner et al. | 172/20 |
| 7,264,063 B1 * | 9/2007 | Dover | 172/2 |
| 2005/0000704 A1 | 1/2005 | Brouwer et al. | |
| 2005/0000705 A1 | 1/2005 | Brouwer et al. | |

FOREIGN PATENT DOCUMENTS

CA    2187603 A1    4/1998

* cited by examiner

*Primary Examiner*—Robert E Pezzuto
(74) *Attorney, Agent, or Firm*—Bereskin & Parr LLP/S.E.N.C.R.L., s.r.l.

(57) ABSTRACT

A sod harvester cuts several side-by-side strips of sod, preferably of total width equal to the width of a pallet, and directs the strips up three sets of conveyors arranged in sequence. The first conveyor set runs at or near ground speed; the second conveyor set runs at about double ground speed, and the third conveyor set runs at about triple ground speed. This creates a spatial and time gap between the trailing edges of a set of sod strips on the third conveyor and the leading edges of the next set of sod strips behind them on the second conveyor. The time gap is sufficient to stop the sod strips on the third conveyor and then pick them up and stack them on a pallet.

20 Claims, 35 Drawing Sheets

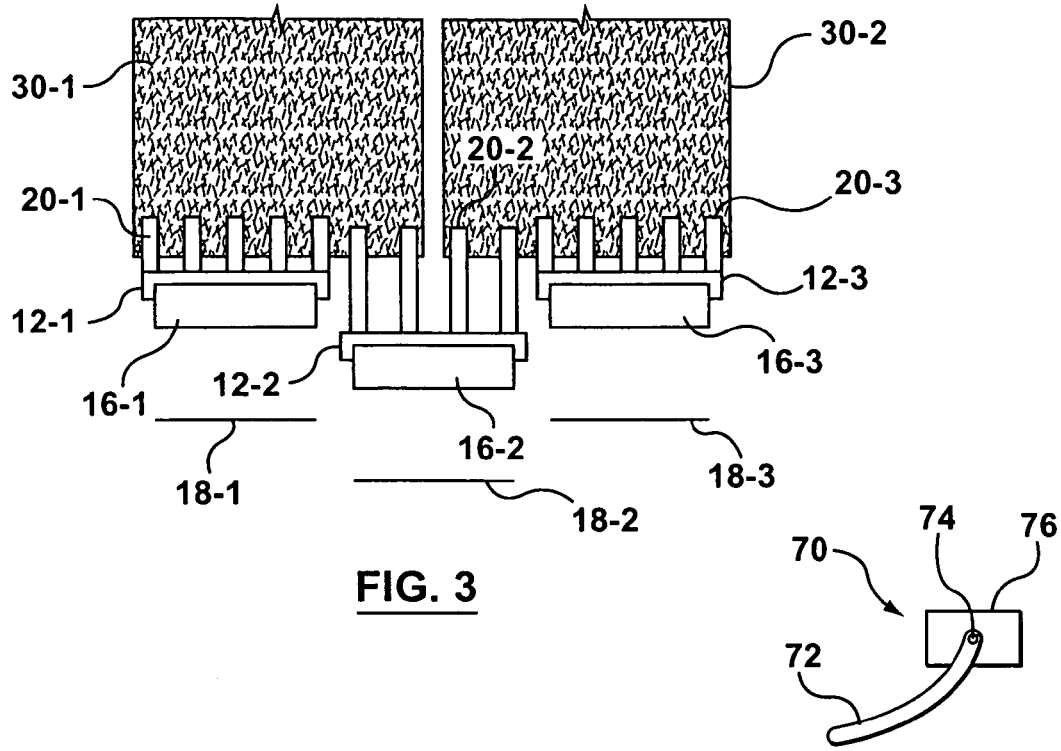
FIG. 3
FIG. 5
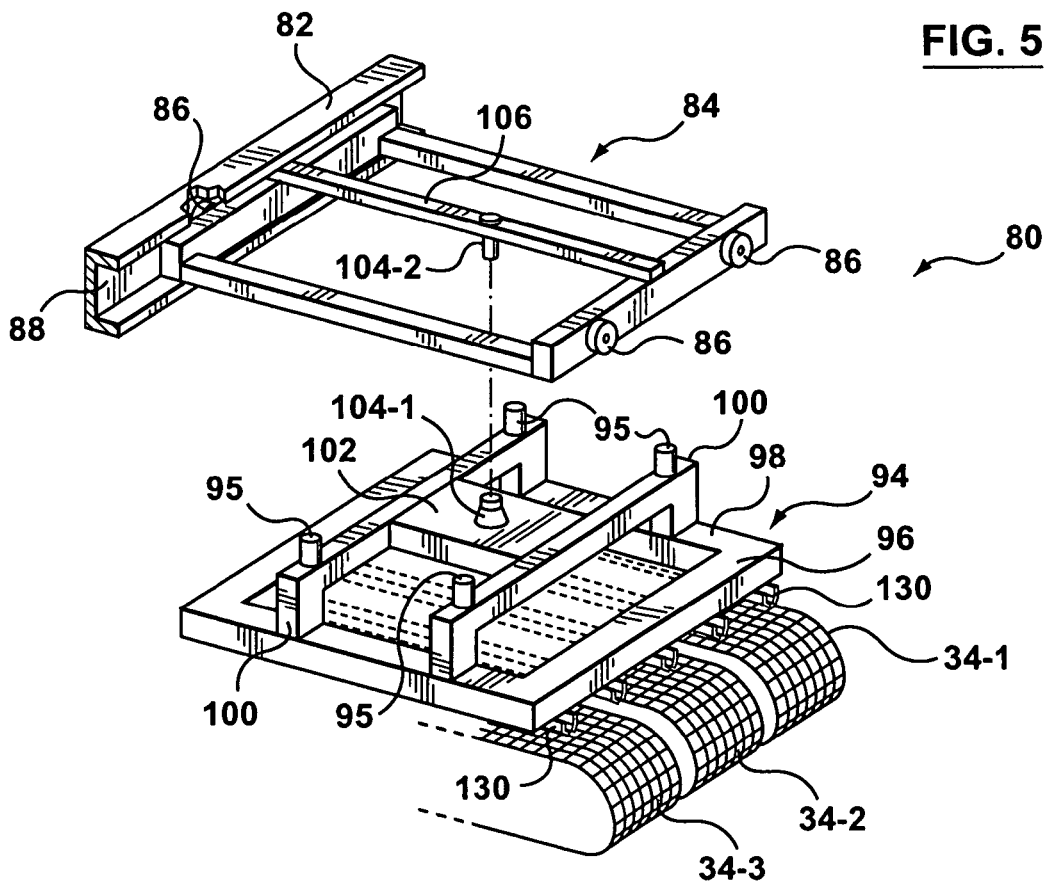
FIG. 6

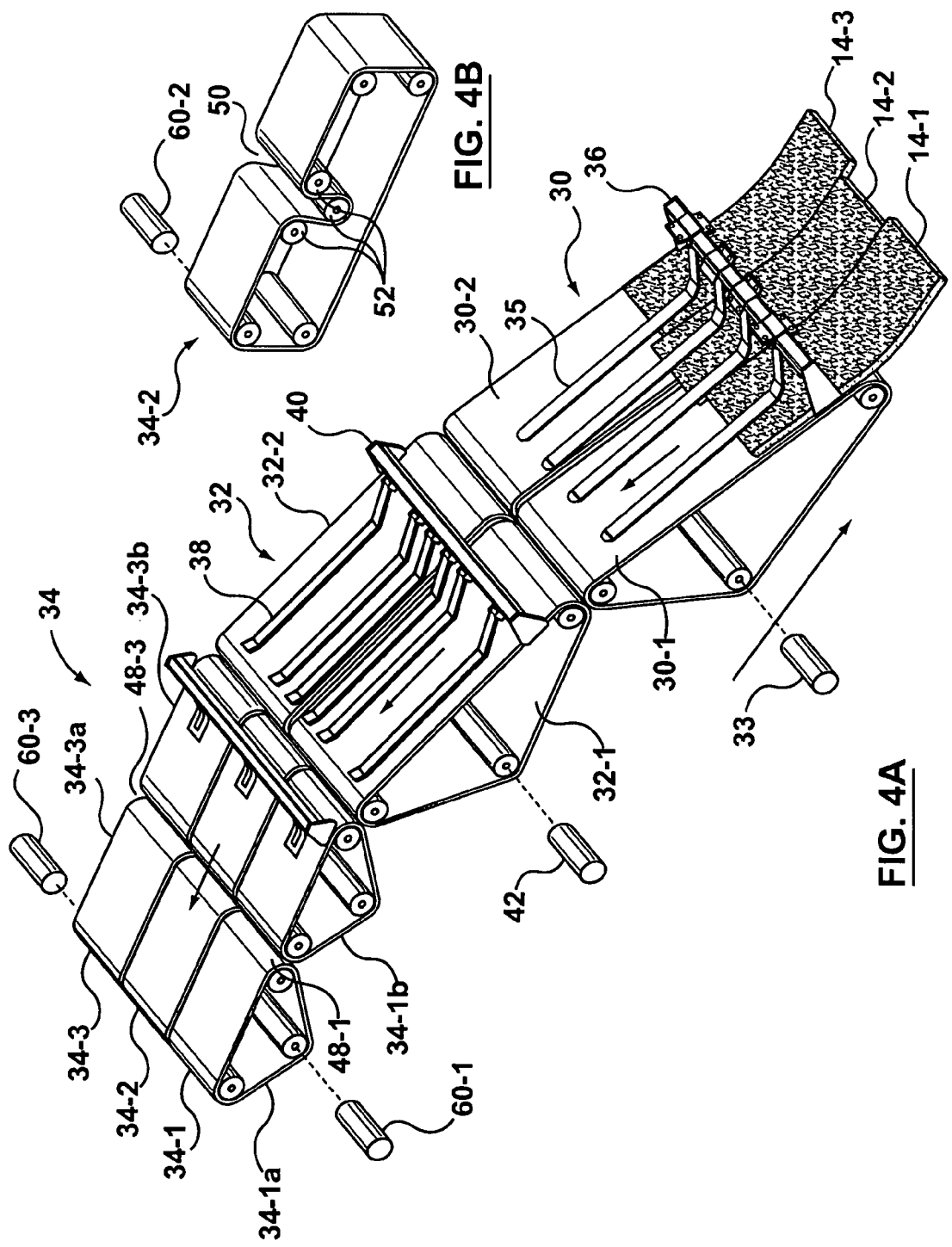

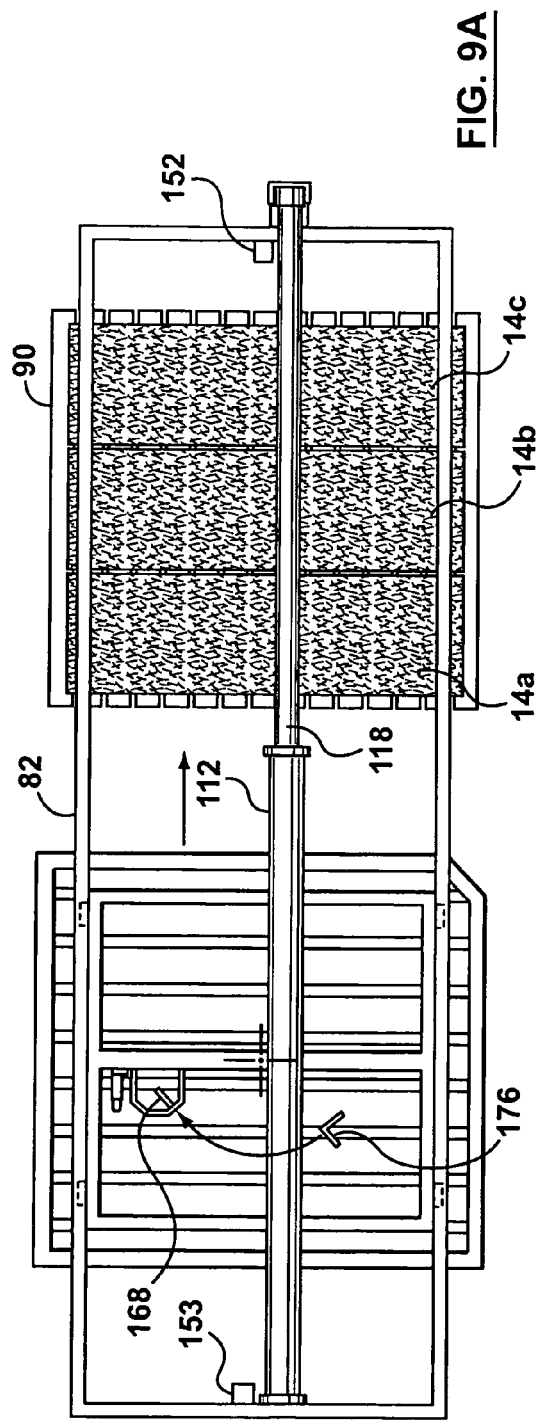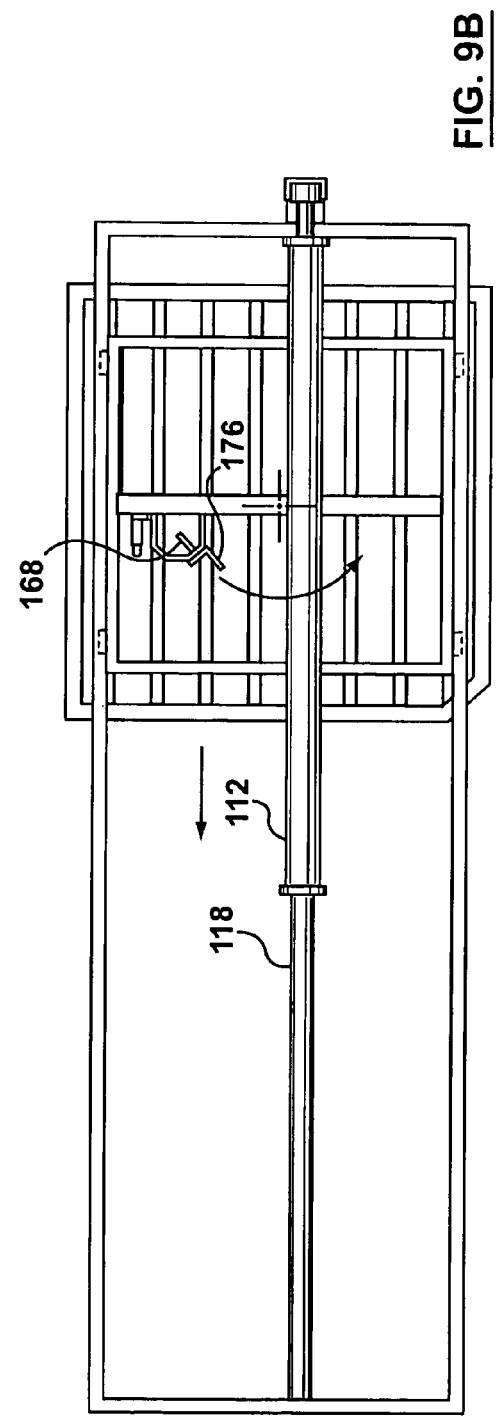
FIG. 9A
FIG. 9B

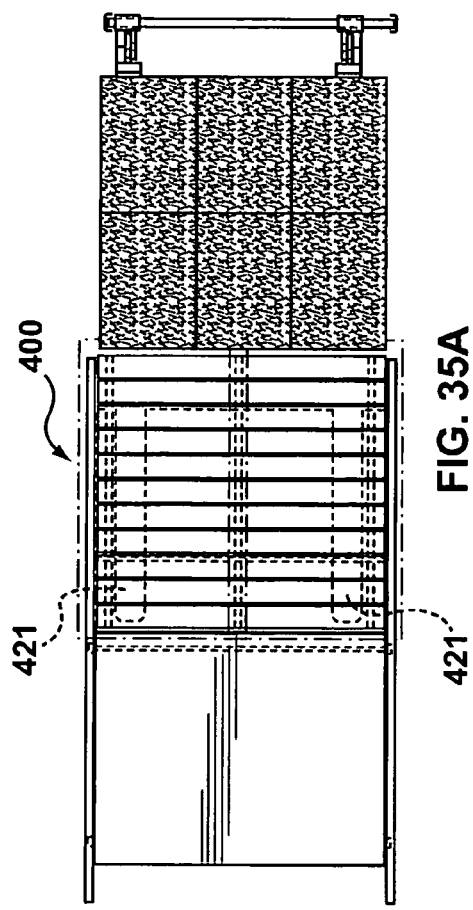
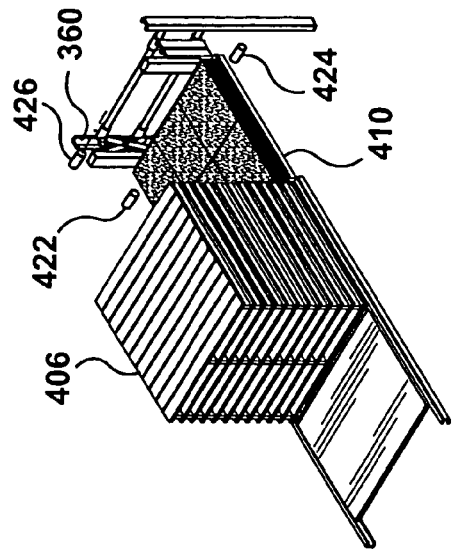
FIG. 35C
FIG. 35A
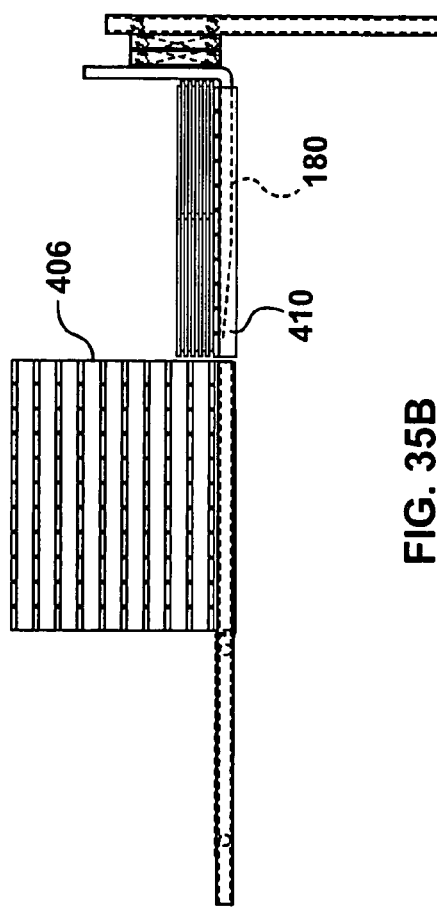
FIG. 35B

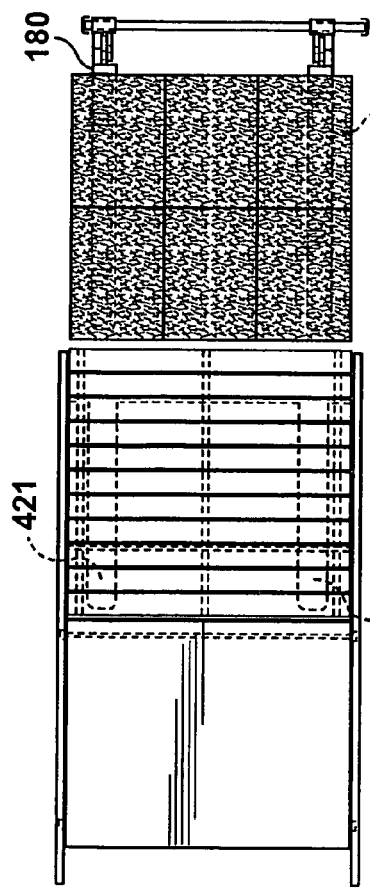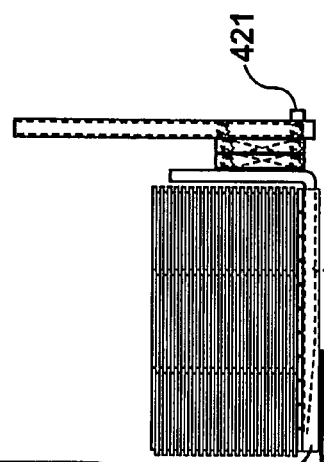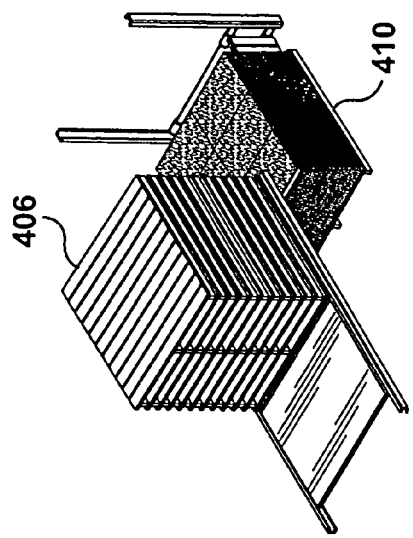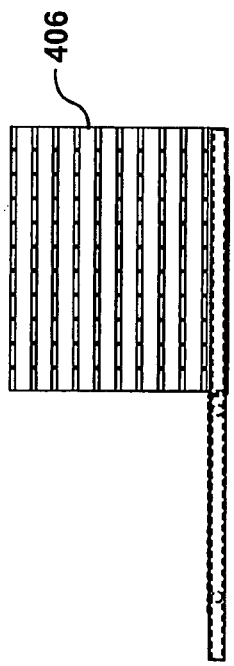
FIG. 36A  FIG. 36B  FIG. 36C

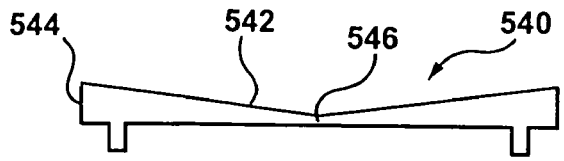
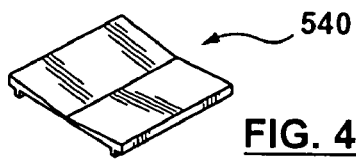
FIG. 42A / FIG. 42B
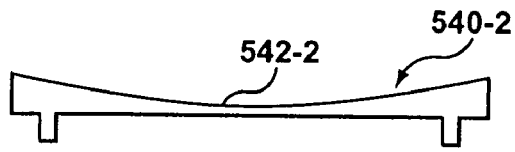
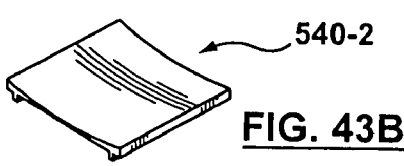
FIG. 43A / FIG. 43B
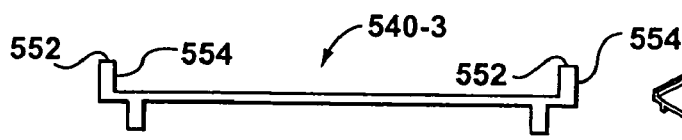
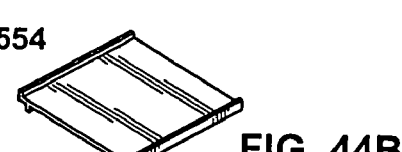
FIG. 44A / FIG. 44B
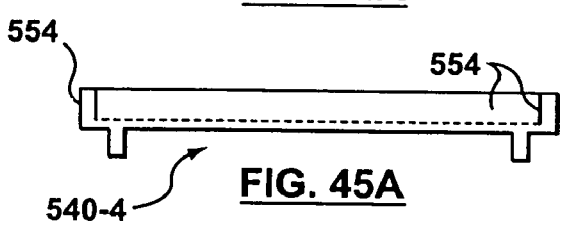
FIG. 45A / FIG. 45B
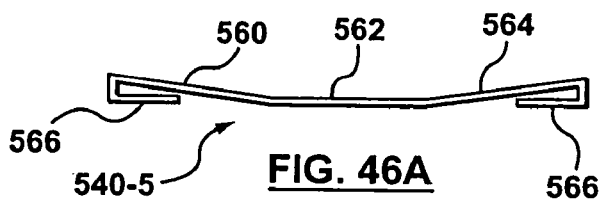
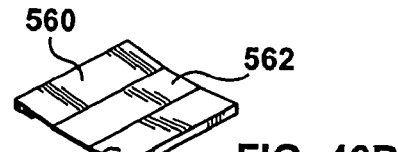
FIG. 46A / FIG. 46B
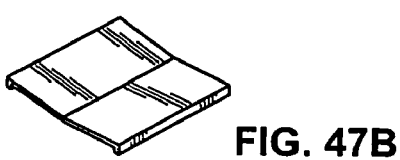
FIG. 47A / FIG. 47B
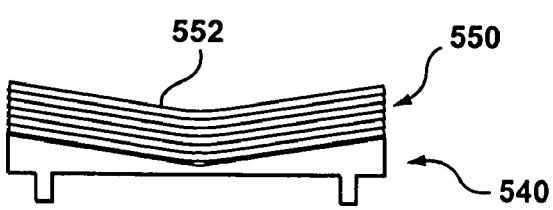
FIG. 48

METHOD AND APPARATUS FOR HARVESTING AND PICKING UP SOD

PRIOR APPLICATION

This application claims the benefit of U.S. Provisional Application Ser. No. 60/649,639, filed Feb. 4, 2005 entitled "METHOD AND APPARATUS FOR HARVESTING AND PICKING UP SOD"; U.S. Provisional Application Ser. No. 60/663,246 filed Mar. 21, 2005 entitled "METHOD AND APPARATUS FOR HARVESTING AND PICKING UP SOD"; U.S. Provisional Application Ser. No. 60/715,135 filed Sep. 9, 2005 entitled "METHOD AND APPARATUS FOR HARVESTING AND PICKING UP SOD"; and U.S. Provisional Application Ser. No. 60/758,195 filed Jan. 12, 2006 entitled "METHOD AND APPARATUS FOR HARVESTING AND PICKING UP SOD".

FIELD OF THE INVENTION

This invention relates to a sod harvester which, after harvesting sod, can pick up the cut sod and stack it, and to methods relating to sod harvesting.

BACKGROUND OF THE INVENTION

Sod harvesters for cutting a strip of sod from the ground and for stacking the sod as a set of slabs on a receiving surface (typically a pallet) have existed for many years. However, prior harvesters which have included a mechanism for automatically stacking slabs of sod on a pallet have been extremely complex and costly. One problem has been that since the strip of sod is normally cut and delivered continuously from the ground, a buffer storage must be provided on the sod harvester to receive sod which continues to be delivered from the cutting knife at the same time when sod which has previously been cut is to be picked up and stacked or moved to another location. The provision of buffer storage for the sod until it can be picked up has in the past added to the size, cost and complexity of the harvester.

BRIEF SUMMARY OF THE INVENTION

It is therefore an object of the present invention, in one of its aspects, to provide a method and apparatus for handling sod in a harvester which cuts a continuous strip of sod, such that the complexity of providing a separate buffer storage for newly cut sod while previously cut sod is being picked up, is reduced. In one aspect the present invention provides a sod harvester adapted for travel along a path of travel and comprising:

a) a sod cutting knife for cutting pieces of sod from the ground, each piece having a leading edge and a trailing edge, b) a conveyor mechanism for carrying sod away from said cutting knife to a first location, c) a sod pick-up mechanism for picking up sod from said first location and for moving such sod to a second location and for then returning to said first location to again pick up sod at said first location, d) said conveyor mechanism including a plurality of conveyors in sequence including a first conveyor for receiving a sod piece from said cutting knife and a second conveyor for receiving and accelerating said sod piece toward said first location to create a time period between the passage of the trailing edge of one sod piece and the arrival of the leading edge of the following sod piece, e) said conveyor mechanism further including a mechanism for supporting a said sod piece in a stopped condition at said first location, while a following sod piece is moving towards said first location, f) said time period being sufficient for a said sod piece to assume said stopped condition at said first location and for said sod pick-up mechanism to pick up and remove the stopped sod piece from said first location before the following sod piece arrives at said first location.

In another aspect the present invention provides a method of harvesting sod comprising:

a) continuously cutting pieces of sod, each piece having a leading edge and a trailing edge, b) conveying said pieces of sod sequentially to a first location, c) while performing said conveying, accelerating each sod piece away from the sod piece behind it to create a time interval between the passage of the trailing edge of one sod piece and the leading edge of the next sod piece, d) stopping a sod piece at said first location and while said sod piece is stopped, picking up said sod piece and then moving such sod piece to a second location, e) the steps of stopping and picking up said sod piece being performed in said time interval.

Further objects and aspects of the invention will appear from the accompanying disclosure, taken together with the accompanying drawings.

BRIEF DESCRIPTION OF THE DRAWINGS

In the drawings:

FIG. 3 is a top view of sod cutting knives and rollers for the FIG. 1 harvester;

FIG. 4A is a perspective view of conveyors for the FIG. 1 sod harvester, with sod advancing up the first set of conveyors;

FIG. 4B is a perspective view of the middle conveyor from the third set of conveyors of the FIG. 1 sod harvester;

FIG. 5 is a diagrammatic view of a sensor for the FIG. 1 sod harvester;

FIG. 6 is a simplified perspective view showing a gantry and a sod carrier for the FIG. 1 sod harvester;

FIG. 9A is a top view showing portions of the gantry and sod carrier of FIG. 6;

FIG. 9B is a top view similar to that of FIG. 9A but showing the sod carrier located over the pallet and rotated 90° from the position of FIG. 9A;

FIG. 35A is a top view of the FIG. 31A arrangement, with the pallet now supported by the forklift forks;

FIG. 35B is a side view of the FIG. 35A arrangement;

FIG. 35C is a perspective view of the FIG. 35A arrangement;

FIG. 36A is a top view of the FIG. 31A arrangement, with the pallet dispenser pulled back and the pallet on the forks loaded with sod and in a lowered position;

FIG. 36B is a side view of the FIG. 36A arrangement;

FIG. 36C is a perspective view of the FIG. 36A arrangement;

FIG. 42A is an end view of a pallet having a concave upper surface;

FIG. 42B is a perspective view of the FIG. 42A pallet;

FIG. 43A is an end view of a modified pallet having a concave upper surface;

FIG. 43B is a perspective view of the FIG. 43A pallet;

FIG. 44A is an end view of a further modified pallet having a concave upper surface;

FIG. 44B is a perspective view of the FIG. 44A pallet;

FIG. 45A is an end view of a still further modified pallet having a concave upper surface;

FIG. 45B is a perspective view of the FIG. 45A pallet;

FIG. 46A is an end view of yet another modified pallet having a concave upper surface;

FIG. 46B is a perspective view of the FIG. 46A pallet;

FIG. 47A is an end view of another modified pallet having a concave upper surface;

FIG. 47B is a perspective view of the FIG. 47A pallet;

FIG. 48 is an end view of the FIG. 47A, FIG. 47B pallet with sod stacked thereon;

DETAILED DESCRIPTION OF PREFERRED EMBODIMENT

Figure 1:
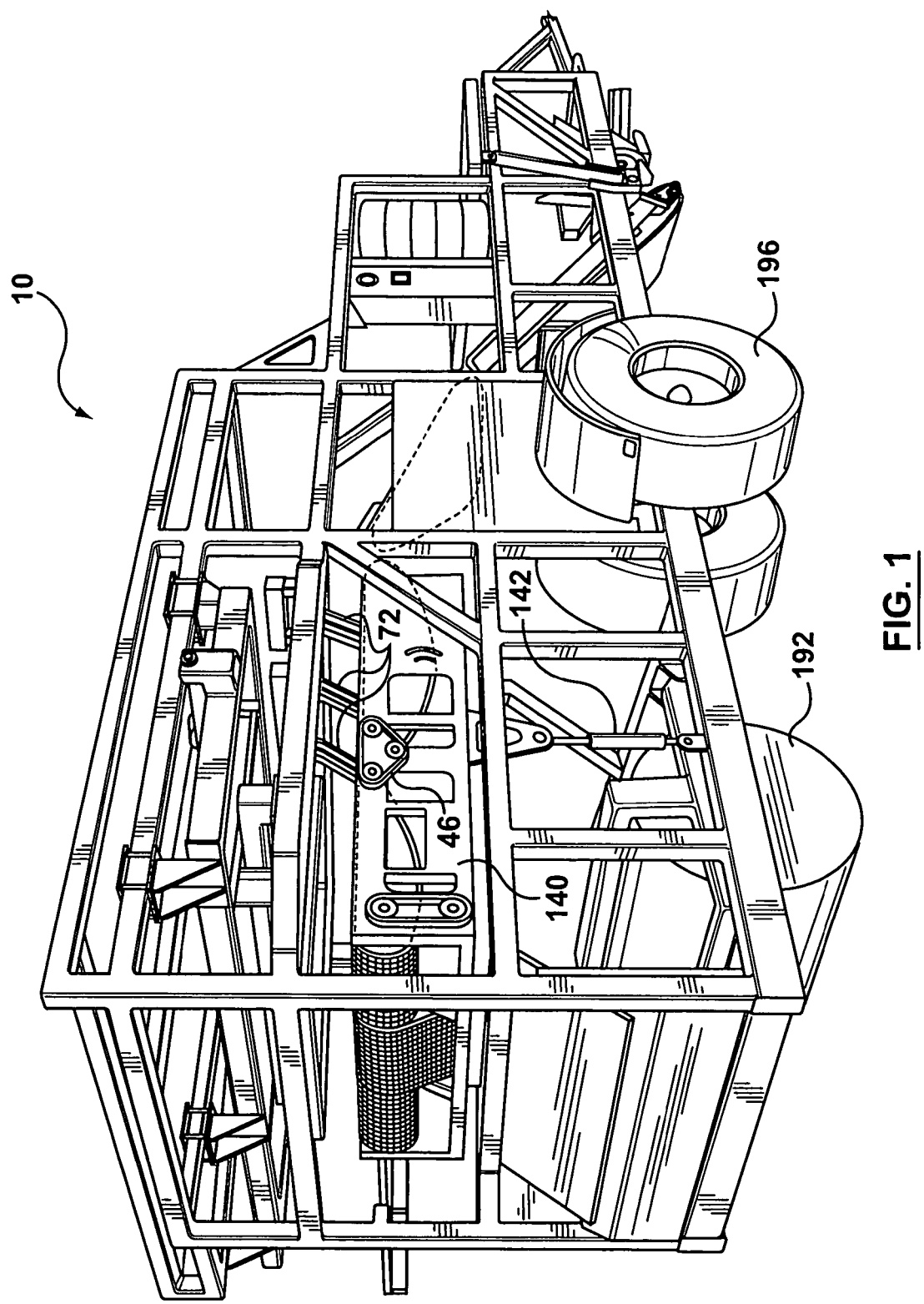
FIG. 1 is a perspective view of a sod harvester according to the invention.
Figure 2:
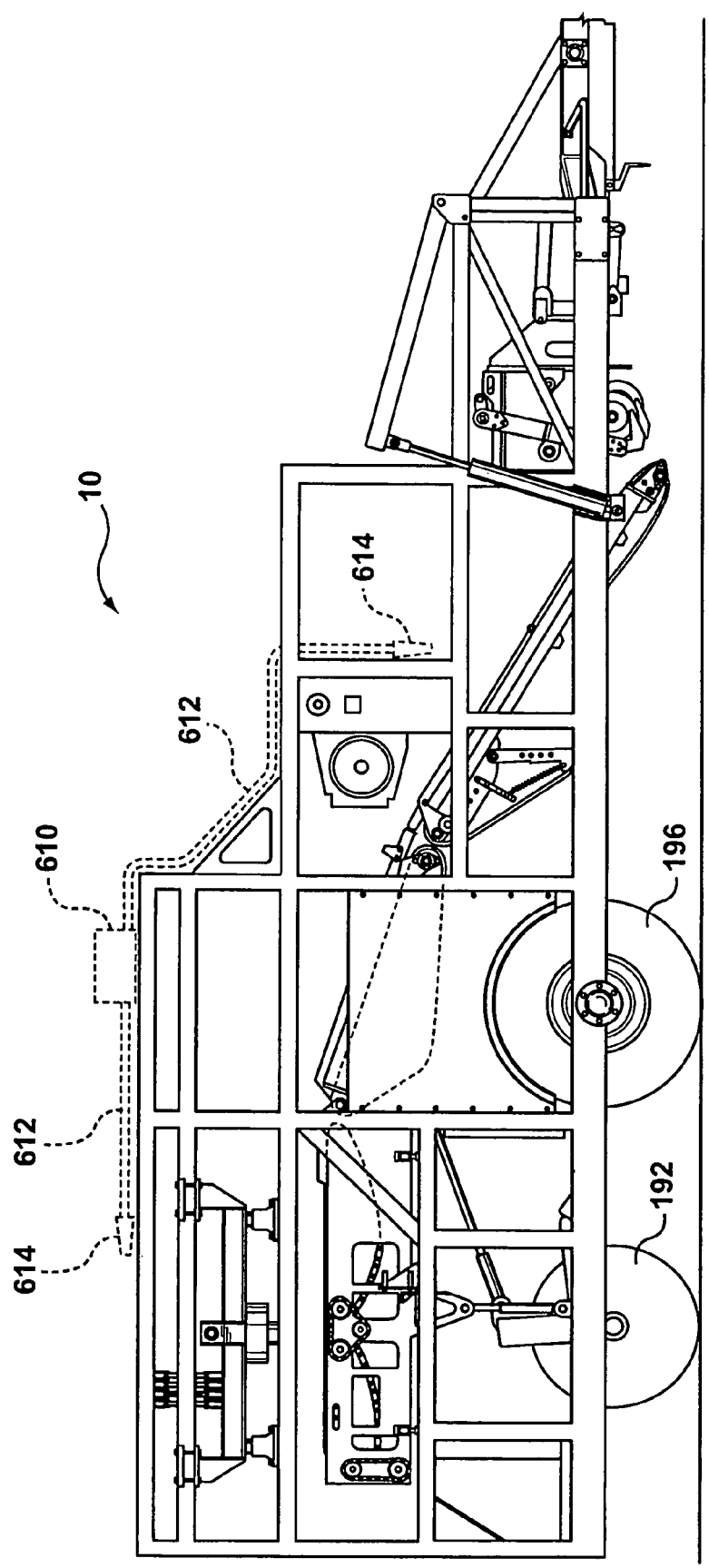
FIG. 2 is a diagrammatic side view of a portion of the sod harvester of FIG. 1.

Reference is first made to FIG. 1, which shows a simplified diagrammatic view of a sod harvester 10 according to the invention. The sod harvester 10 is intended to be pulled by a towing vehicle, e.g. a tractor (not shown), but it will be appreciated that a sod harvester according to the invention can be self-propelled, or it can be mounted directly on the side of a tractor, as is well known in the field.

The harvester 10 is intended to cut slabs of sod and to stack the slabs in flat condition on a pallet, as contrasted with sod harvesters which produce rolls of sod. Preferably, the sod harvester 10 cuts side-by-side strips of sod of sufficient total width to constitute an entire single layer on the pallet, so as to simplify stacking the cut slabs of sod on the pallet (as will be explained). Typically, therefore, the harvester 10 may have three vibrating sod cutting knives 12-1, 12-2, 12-3 (best shown in FIG. 3) which undercut and side cut three side-by-side strips of sod 14-1, 14-2, 14-3 (FIG. 4A). Rollers 16-1, 16-2, 16-3 (FIG. 3) ahead of the cutting knives roll the sod before the sod is cut, and vertically moving cross-cut knives 18-1, 18-2, 18-3 positioned ahead of the rollers are driven into the ground at desired intervals to cut the strips of sod into lengths (i.e. into pieces or slabs of soil). Conventional fingers 20-1, 20-2, 20-3 attached to and extending rearwardly from the cutting knives guide the cut sod onto conveyors (to be described) of the sod harvester. Conventional means, not shown, are provided to lift the cutting knives and rollers above the ground when they are not being used for cutting, so that the harvester 10 can travel.

The vibrating sod cutting knives, rollers, cross-cut knives and fingers have all been well-known in the industry for many years and are shown, for example, in U.S. Pat. No. 3,509,944 issued May 5, 1970.

It is desirable that the three strips of sod 14-1, 14-2, 14-3 cut by harvester 10 be located closely adjacent each other from a side-by-side perspective, with minimal lateral gaps between them, so as not to leave narrow uncut (and wasted) strips of sod in the field being cut. Therefore, preferably the center sod cutting knife 12-2 and its associated roller 16-2 and cross-cut knife 18-2 are offset forwardly of the two outer sod cutting knives and rollers, as shown in FIG. 3. With this arrangement, the two outer knives and their associated mechanisms can be moved laterally inwardly toward the center sod cutting knife 12-2 to minimize or to reduce to zero any gaps between adjacent sod strips. (In some sod growing areas, where after harvesting sod is regrown from pieces of sod left in the field, then very narrow "ribbons" of uncut sod may be left between adjacent cut strips, to assist in regrowth of new sod after harvesting.)

In a typical harvester version, the center sod cutting knife 12-2 may be located, e.g. eight inches in front of the two outer sod cutting knives 12-1, 12-3, but this distance can be varied and different offset patterns can be used if desired. In the version shown in FIG. 3, the fingers 20-2 extending rearwardly from the center sod cutting knife 12-2 are longer than the fingers 20-1, 20-3 of the two outer knives, to guide the cut sod onto the conveyors described below.

As best shown in FIGS. 4A to 4D, the harvester 10 includes three sequential sets of conveyors 30, 32, 34 to move the cut sod pieces from the cutting knives rearwardly to a location from which the cut sod pieces can be picked up and transferred to a pallet or other desired support.

Figure 10:
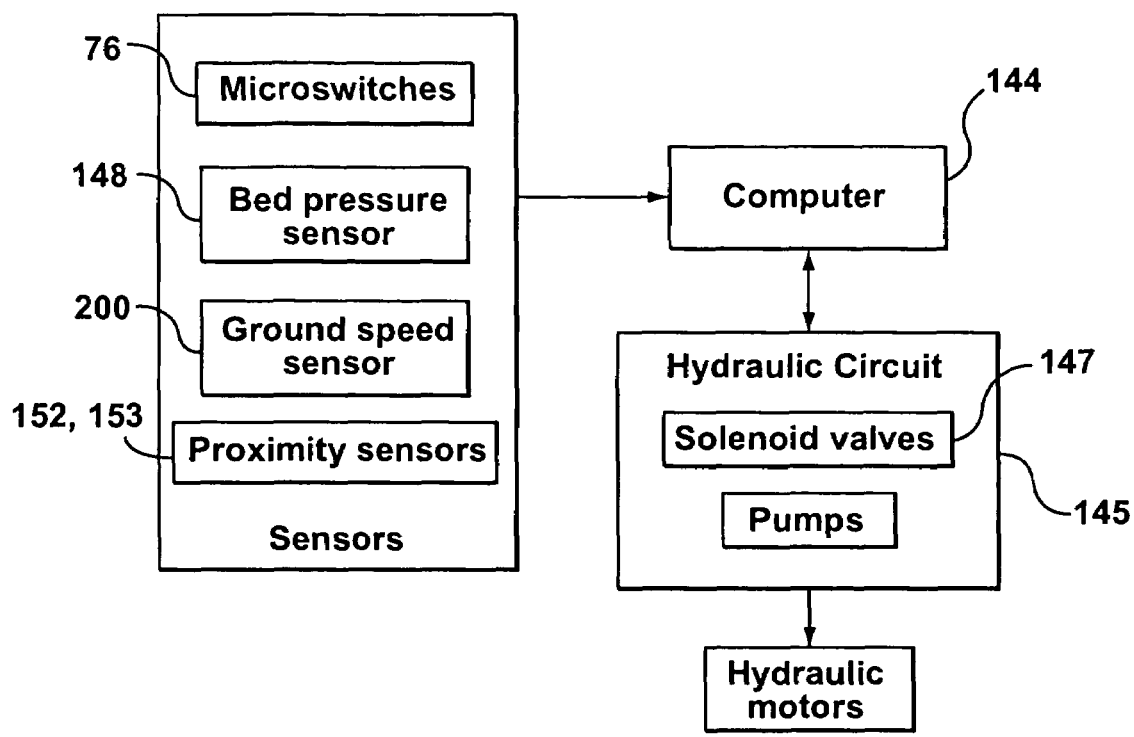
FIG. 10 is a diagrammatic view of sensors, a computer and a hydraulic circuit for the FIG. 1 sod harvester.

The first set of conveyors 30 includes two side-by-side conveyors 30-1, 30-2 driven at slightly greater than ground speed (ground speed being the speed at which the machine travels over the ground) by a hydraulic motor diagrammatically indicated at 33. The first set of conveyors 30 can consist of a single conveyor, or it can consist of three or four side-by-side conveyors (any number can be used), but two side-by-side conveyors 30-1, 30-2 have been found convenient from a production viewpoint. The conveyors 30-1, 30-2 both operate at the same speed, and since they carry the cut sod upwardly at a relatively steep angle, elongated fingers 35, pivotably mounted on a bridge 36 extending across the conveyors 30-1, 30-2, are positioned to lie against the cut sod strips as the sod travels upwardly, to reduce slippage of the sod on the conveyors 30-1, 30-2 and to prevent the leading edges of the cut sod strip from curling back downhill. As is well-known in the industry, the speed of hydraulic motor 33 is controlled by a hydraulic circuit (indicated at 145 in FIG. 10) which reads ground speed from a conventional sensor 200.

Figure 4C:
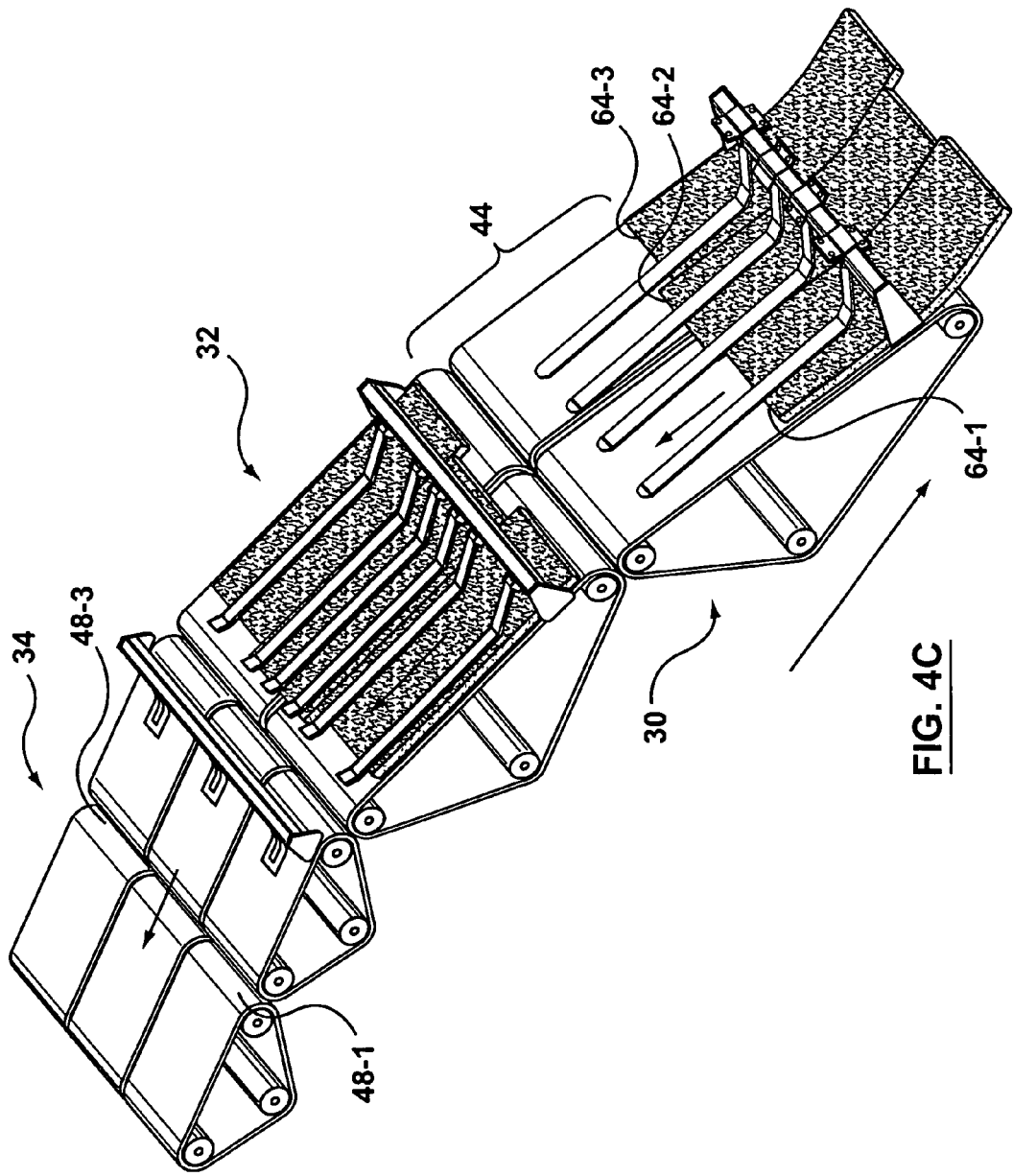
FIG. 4C is a perspective view similar to that of FIG. 4A but showing sod located on the first and second sets of conveyors.

The second set of conveyors 32 also consist of two side-by-side conveyors 32-1, 32-2 (although again, any desired number can be used). Again, elongated fingers 38 are provided, pivotably mounted on a bridge 40 extending across the second set of conveyors 32, to overlie the sod strips as they travel up the second conveyor set 32, again to reduce slippage of the sod on the second conveyors and to prevent the leading edges of the sod strips from curling back. The second set of conveyors are driven in unison by a hydraulic motor diagrammatically indicated at 42, preferably at approximately twice ground speed. Thus, when the sod strips 14-1 to 14-3 reach the second set of conveyors 32, as shown in FIG. 4C, the sod strips will be accelerated away from the sod strips on the first set of conveyors 30, leaving a gap indicated at 44 in FIG. 4C, for a reason to be described.

From the second set of conveyors 32, the three side-by-side sod strips 14-1, 14-2, 14-3 next travel onto the third conveyor set 34, which consists of three side-by-side conveyors 34-1, 34-2, 34-3, one to accommodate each sod strip. In a preferred embodiment, the outer third conveyors 34-1, 34-3 are each divided into two sub-conveyors 34-1$a$, 34-1$b$ and 34-3$a$, 34-3$b$. The sub-conveyors of each side conveyor 34-1, 34-3 are linked by a chain and sprocket mechanism 46 (FIG. 1) so that only one of the two sub-conveyors need be driven to drive both sub-conveyors of an outer conveyor. The division of each side third set conveyor 34-1, 34-3 into two sub-conveyors provides a gap or depression 48-1, 48-3 in the center of the top rear of these conveyors, to accommodate a cross-cut knife as will be explained.

Since there may not be space to divide the center third set conveyor 34-2 into two sub-conveyors, the center third set conveyor 34-2, as shown in FIG. 4B, has a center depression 50 provided by three rollers 52, to accommodate a cross-cut blade if a cross-cut is needed.

Each third set conveyor 34-1, 34-2, 34-3 is driven separately by a hydraulic motor 60-1, 60-2, 60-3. All three third set conveyors 34-1, 34-2, 34-3 preferably operate at approximately three times ground speed, thus accelerating the sod strips away from the sod strips following behind them on the second set conveyors 32 and producing a gap 62 (FIG. 4D) between the trailing edges of the sod strips on the third set conveyors and the leading edges of the sod strips on the second set conveyors. The gap 62 is typically larger than the gap 44.

In the operation of the sod harvester 10 as so far described, the three strips of sod 14-1 to 14-3 are cut by cutting knives 12-1 to 12-3 and cross-cut knives 18-1 to 18-3 and travel up the first and second conveyor sets 30, 32 as shown in FIGS. 4A and 4C. Since the center cutting knife 12-2 and cross-cut knife 18-2 are positioned ahead of the two side knives, the center sod strip 14-2 will be cut and released from the ground first and therefore its leading edge 64-2 on first conveyor set 30 will be ahead of (i.e. offset from) the leading edges 64-1, 64-3 of the two side sod strips 14-1, 14-3 (see FIG. 4A). This offset of leading edge 64-2 continues on the second set conveyors 32 (see FIG. 4D).

Figure 4D:
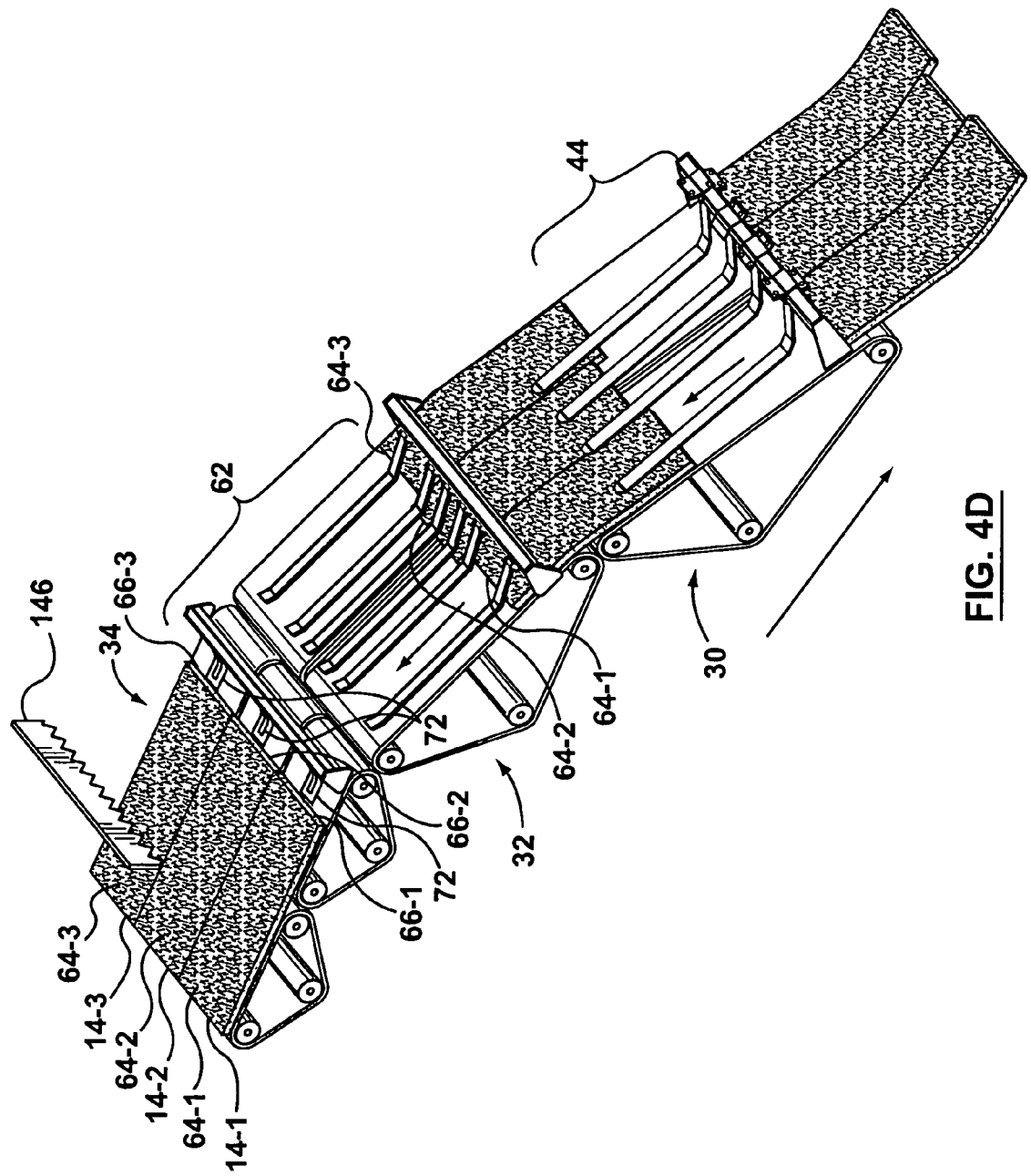
FIG. 4D is a view similar to that of FIG. 4C but showing sod advancing up the first and second sets of conveyors and with sod also located on the third set of conveyors.

When the sod strips 14-1 to 14-3 reach the third set conveyors 34, they are accelerated onto those conveyors until their respective trailing edges 66-1, 66-2, 66-3 pass individual sensors 70 (FIG. 5) for each third set conveyor. The sensors 70 each consist of a tongue 72 which rests on its associated third set conveyor and is attached at rotary connection 74 to a microswitch 76. When a sod strip on a third set conveyor 34-1, 34-2 or 34-3 passes out from under the tongue 72, the tongue 72 drops slightly (by the thickness of the sod strip), operating the microswitch 76. The three microswitches 76 are connected to a computer (to be discussed) which then shuts off the third set conveyor 34-1, 34-2 or 34-3 in question until the start of the next cycle (as will be described). The result of this individual control of the third set conveyors 34 is that all three strips of sod 14-1 to 14-3 are automatically positioned on the third set conveyors 34 with their leading edges aligned (and therefore also with their trailing edges aligned), as shown in FIG. 4D (even though previously the leading edge 64-2 of the center sod strip 14-2 was ahead of the other two leading edges).

The third set conveyors 34 acts as a storage or buffer set of conveyors, providing a location from which the sod strips can be picked up and transferred to a pallet. The gap 62 between the leading edges of the sod strips advancing up the second conveyor set 32, and the trailing edges of the sod strips located on the third conveyor set 34, provides a time period or time interval during which the sod strips on the third conveyor set 34 can be picked up and transferred to a pallet or other stacking location (or at least can be picked up and moved away from the third conveyor set) before the next set of sod strips arrives at the third conveyor set.

A preferred mechanism for picking up the sod strips, moving them over a pallet, and depositing them on the pallet will next be described with reference to FIG. 6 and following. As there shown, the harvester 10 has a sod pick-up and transfer mechanism 80. Mechanism 80 includes a gantry arrangement which comprises a guide frame 82 fixedly mounted on the harvester 10, and a gantry 84 mounted on the guide frame 82 by wheels 86 (one at each corner of the gantry) so that the gantry can roll back and forth in a side-to-side direction on the frame 82, with the wheels 86 supported and guided in channels 88 at the sides of the guide frame 82.

Figure 8A:
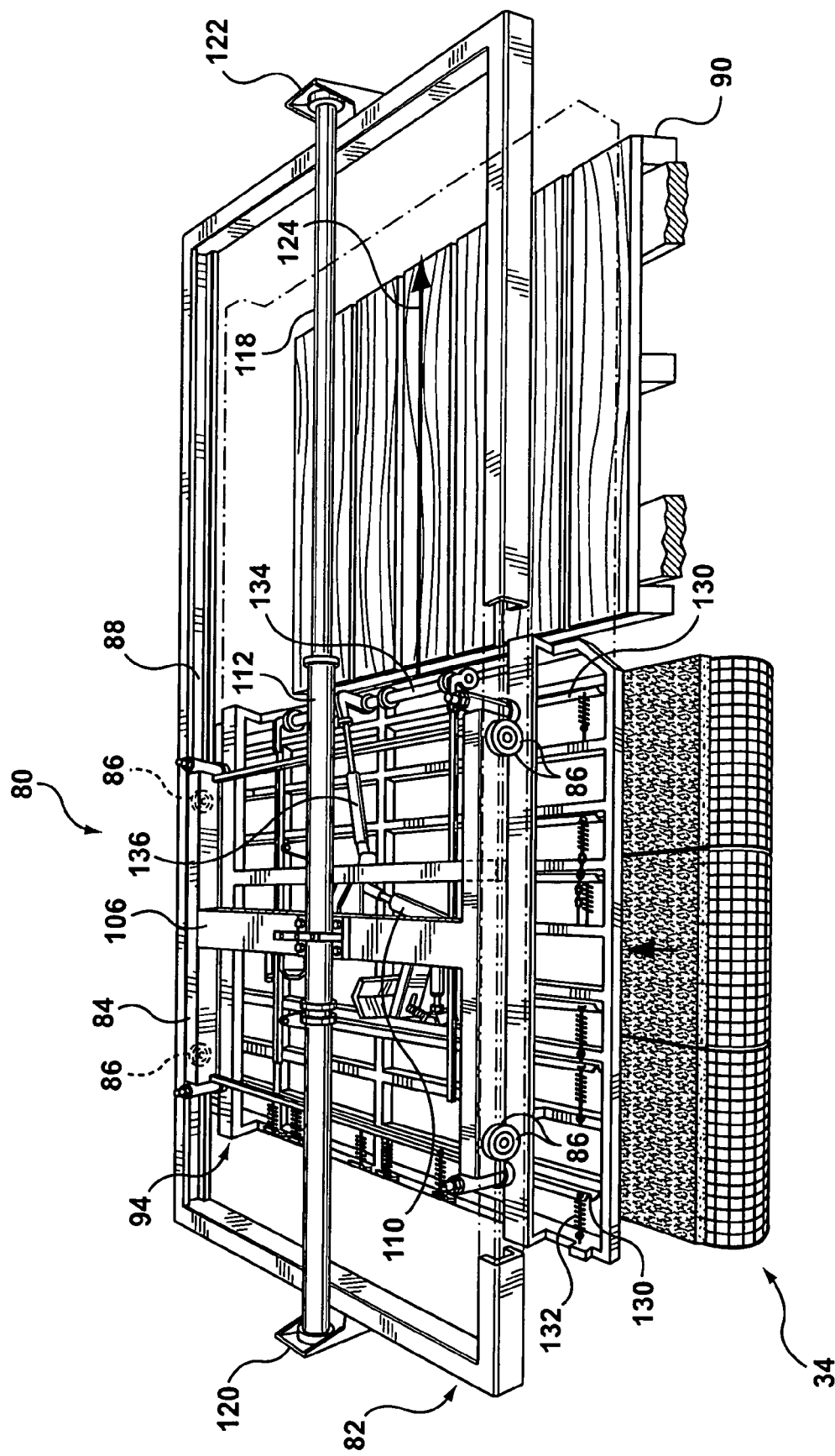
FIG. 8A is another perspective view of the gantry and sod carrier of the FIG. 1 harvester, in place over the third conveyor set and over a pallet.
Figure 8B:
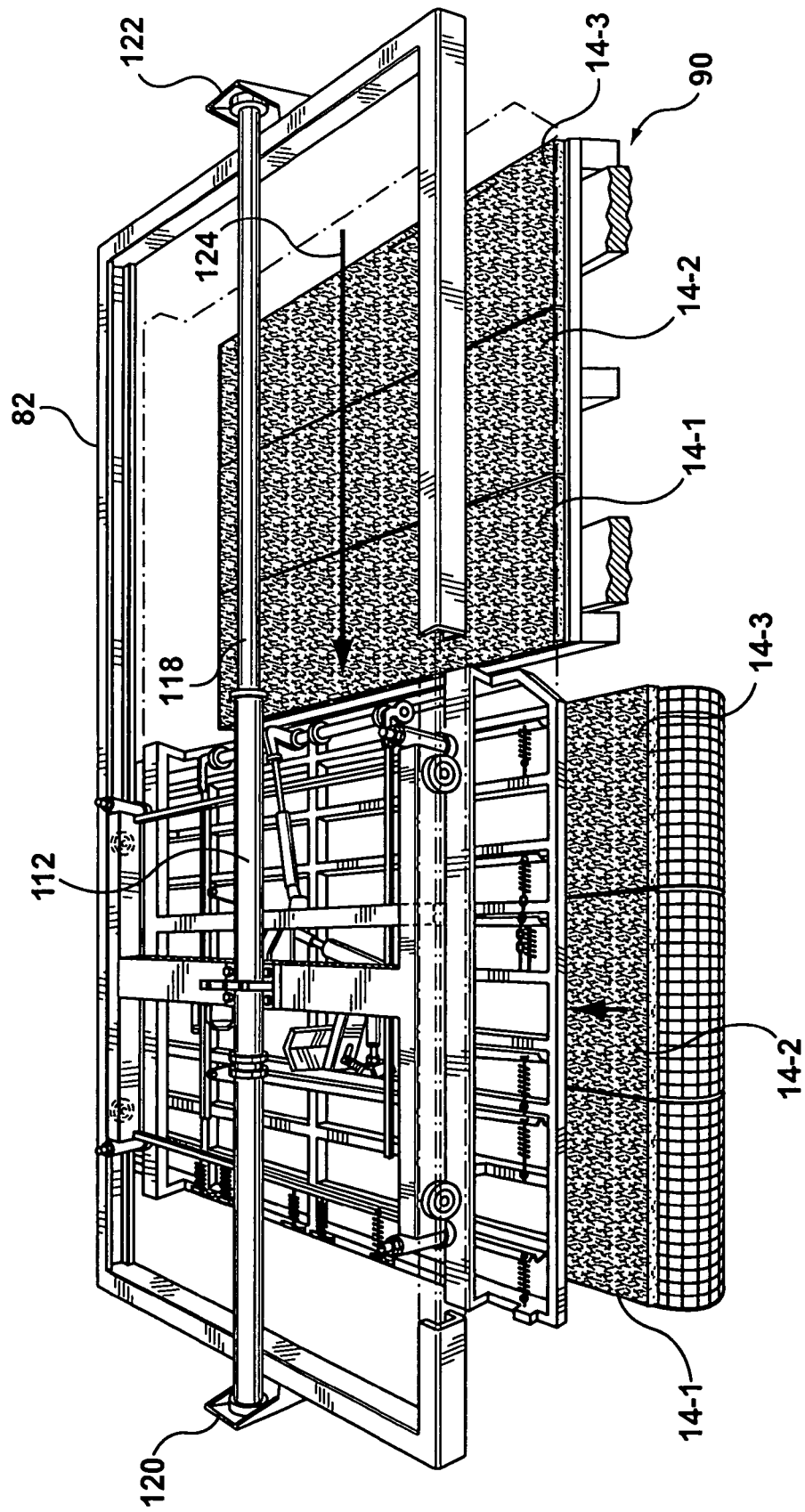
FIG. 8B is a view similar to that of FIG. 8A but showing sod located on the pallet, having been deposited there by the sod carrier.

The guide frame 82 extends over the third set conveyors 34 and also extends over a pallet 90 (FIG. 8A) supported on a forklift 92 located at one side of the third set conveyors 34. A sod carrier 94 is suspended from the gantry 84 and serves to pick-up the sod from the third set conveyors 34, after which (as will be described) the gantry 84 travels laterally to a position over the pallet 90. The sod carrier 94 then deposits its layer of sod on the pallet 90.

The sod carrier 94 includes side and end frame members 96, 98 defining a frame for the sod carrier, and also includes upper frame members 100 spanning the side frame members 96 and connected thereto. A cross frame member 102 extends between the upper frame members 100 and supports half 104-1 of a ball joint 104. The other half 104-2 of ball joint 104 is connected to a cross member 106 in the gantry 84, so that the sod carrier 94 is suspended from the gantry 84 and is able to rock and tilt to a limited extent relative to the gantry 84, and is also able to rotate with respect to the gantry 84.

Figure 7:
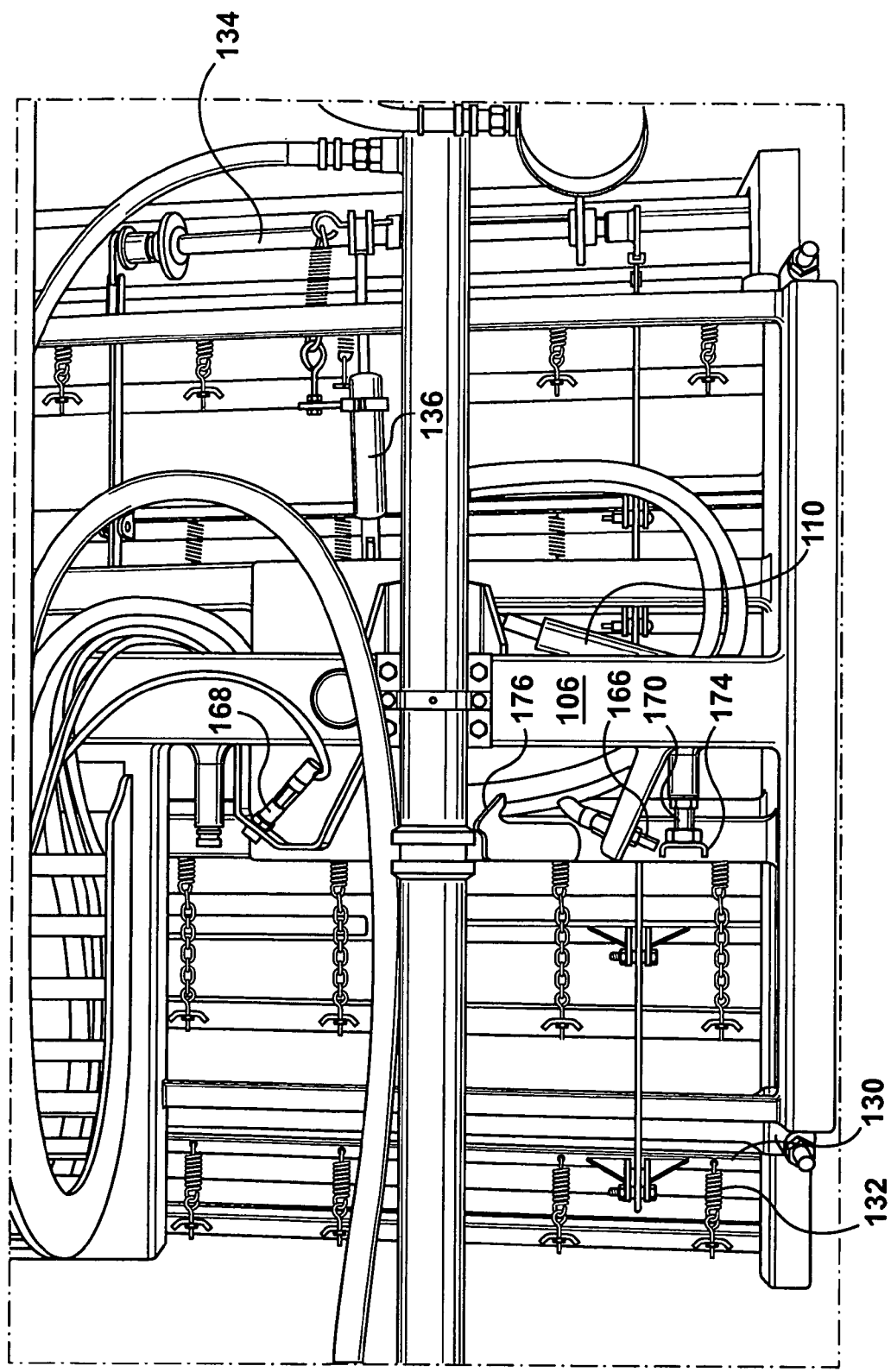
FIG. 7 is a top view of the gantry and sod carrier of FIG. 6.

A rotate piston and cylinder 110 (FIG. 7) is connected between a frame member of the gantry 84 and the sod carrier 94, the attachment point on the sod carrier being spaced from ball joint 104. The piston and cylinder 110 is connected so that it can rotate the sod carrier 94 on the gantry 84 by 90° when commanded to do so. (Alternatively, a conventional rotary actuator can be used to rotate the sod carrier on the gantry.)

The gantry 84 is moved on guide frame 82 between a first position over the third set conveyors 34 (shown in FIG. 8A) and a second position over the pallet 90 (shown in FIG. 9B) by an elongated double-acting (two-ended) cylinder 112 which is mounted at 114 on upper frame member 106 of the gantry 84. An elongated piston rod 118 extends through the cylinder 112 and is mounted at both ends, at 120, 122, to the guide frame 82. A piston (not shown) is located in the cylinder 112, so that as hydraulic fluid is injected into the cylinder 112 at either end (by hoses not shown), the cylinder 112 will travel back and forth in the direction of arrow 124, carrying the gantry 84 with it, to move the gantry between the two positions described (one over the third set conveyors 34 and the other over the pallet 90).

The sod carrier 94 suspended from the gantry 84 is essentially the same as that shown in U.S. patent application Ser. No. 10/780,616, filed Feb. 19, 2004 entitled "Method and Apparatus for Picking Up Sod from the Top", published Jan. 6, 2005, the description and drawings of which are incorporated by reference herein. Since the sod pick-up features of the sod carrier 94 are fully described and illustrated in such published patent application, those features will be described only briefly here. Specifically, the sod carrier 94 includes (see FIGS. 7, 8A) a number of pairs of clamps 130 which extend parallel to each other at the bottom of the sod carrier 94. The clamps 130 are strongly biased to a closed position by springs 132 but can be opened by a linkage 134 (not shown in detail in this application) which is operated by a piston and cylinder 136.

In operation, as described, three sod strips travel up the first and second conveyor sets 30, 32 and onto the third conveyor set 34. Since the three sod strips are not usually perfectly aligned (as mentioned, the middle sod strip is ahead of the two side sod strips, and the two side sod strips may slip unequally on the conveyors), each conveyor of the third conveyor set is separately driven and controlled (as described) to shut off individually when its sod strip is properly positioned on the third conveyor in question. This ensures that all three sod strips on the third conveyor set are aligned evenly with each other and ready to be picked up. If the sod is defective, the operator can manually override (using a manual control, not shown) the sensors which normally stop the third conveyor set 34 and can cause the third conveyor set 34 to continue operating, thus ejecting the defective sod pieces onto the ground.

As shown in FIG. 1, the third conveyor set 34 is mounted in a bed frame 140 which can be raised and lowered using piston and cylinder sets 142 at each side of the bed frame (and with additional conventional guides, not shown). When the three sod strips are aligned on the third conveyor set 34, thus shutting off all of the third conveyors 34-1, 34-2, 34-3 as previously described, a computer 144 (described below in connection with FIG. 10) sends a signal to operate the pistons and cylinders 142 (part of hydraulic circuit 145, FIG. 10), raising the conveyor bed frame 140 and pressing the sod strips on the third conveyor set 34 against the clamps 130 on the underside of the sod carrier 94. At this time, the sod carrier 94 is pushed against the gantry 84, and the pressure is transmitted to the gantry by rubber pads 95 atop the sod carrier and which press against the underside of the gantry. Besides absorbing pressure when the sod carrier 94 is pushed against the gantry 84, the rubber pads 95 serve an additional purpose. If the sod strips on the third conveyor set 34 happen to be of uneven thickness, e.g. thicker at one side of the third conveyor set than the other, then the rubber pads 95, together with the limited rocking and tilting permitted by ball joint 104, permit the sod carrier 94 to tilt to compensate at least to some extent for the uneven thickness, allowing the clamps 130 to clamp all of the sod strips on the third conveyor set 34, rather than failing to clamp some of the sod strips.

If it is desired to cut the sod strips 14-1 to 14-3 each into two shorter pieces, a knife 146 (FIG. 4D) can be fixed in the underside of sod carrier 94 as described in the above-mentioned published pending application, thus dividing each sod strip 14-1 to 14-3 into two parts. The computer 144 typically operates control solenoids valves 147 in the hydraulic circuit 145 to operate the pistons and cylinders described. The pressure with which the conveyor bed frame 140 presses the sod strips on the third conveyor set 34 against the clamps 130 is preferably made adjustable, to allow better gripping of the sod by the clamps when the sod is of different soil types. (For example, for tough soil, a higher pressure is needed.)

Figure 11:
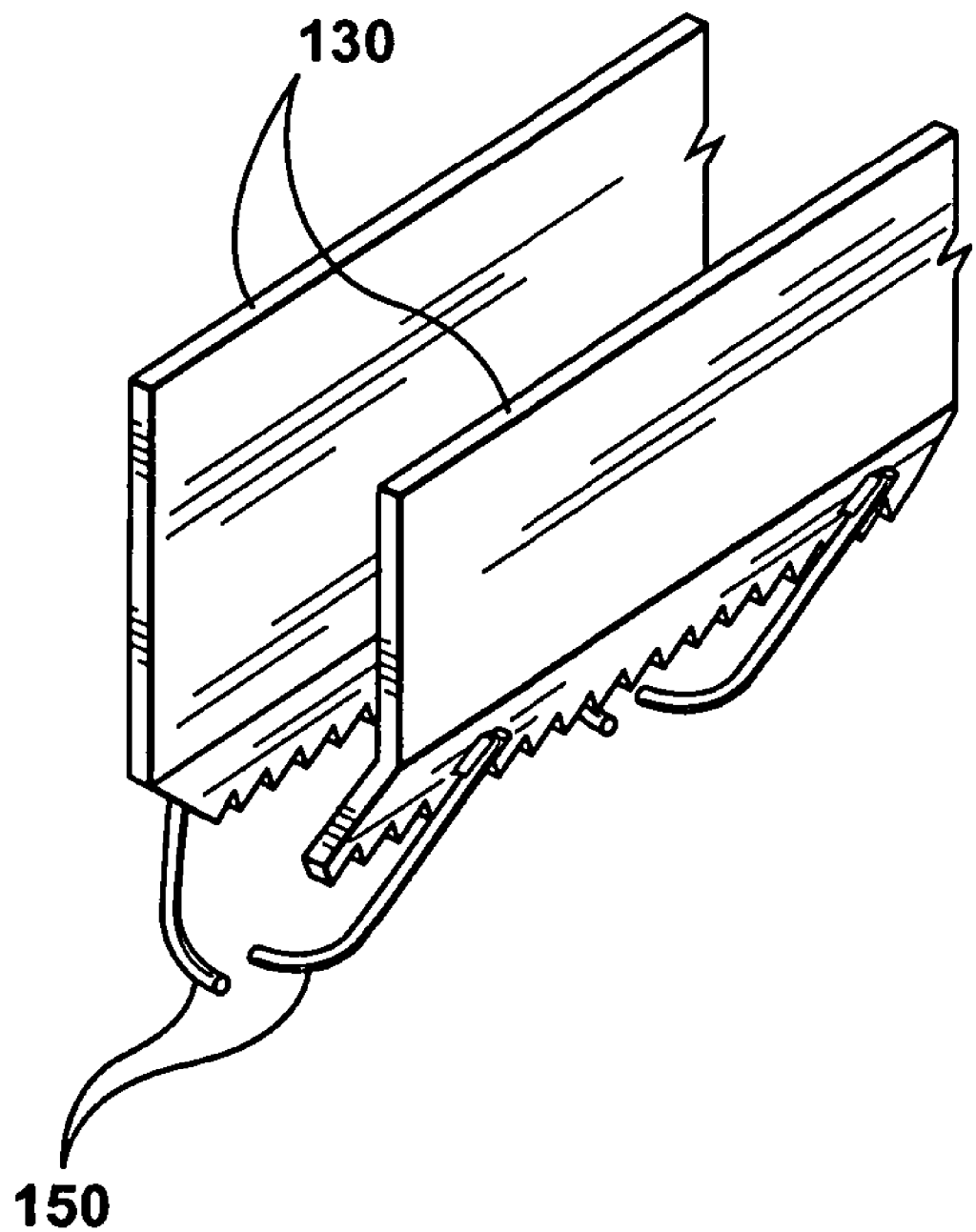
FIG. 11 is a perspective view of a portion of a clamp on the sod carrier of the FIG. 1 harvester.

The pressure with which the bed frame 140, and hence the sod strips 14-1 to 14-3 are pressed against the underside of the sod carrier 94 is sensed by a pressure sensor 148 (FIG. 10) connected to one of the piston and cylinders 142 which raise the bed 140. When the pressure is sufficiently high, this is detected by the computer 144 which then sends a signal to a solenoid valve controlling the clamp piston and cylinder 136, depressurizing this piston and cylinder and allowing the springs 132 to snap the clamps 130 closed. The clamps 130 then grip the sod by its blades, as described in the above published co-pending application. In some cases, if the equipment is likely to operate over muddy ground and if the mud may clog the clamps 130 and prevent them from gripping the sod strips properly, a series of hooks 150 (FIG. 11) may be added to the clamps, to provide improved grip by the sod carrier 94 on the sod strips. The hooks 150 are relatively short and will not support the sod strips by themselves, so that when the clamps 130 are opened, the sod strips 14-1 to 14-3 (which are heavy) will quickly drop away from the sod carrier 94. (If a sufficient number of closely spaced hooks 150 are used, then these hooks are capable of supporting the sod strips by themselves and can in effect constitute a clamp. When the hooks are separated by the clamp opening action, then the heavy sod strips will drop away from the hooks 150.) Alternatively, the clamps can be formed as a series of straight or curved fingers.

Figure 9C:
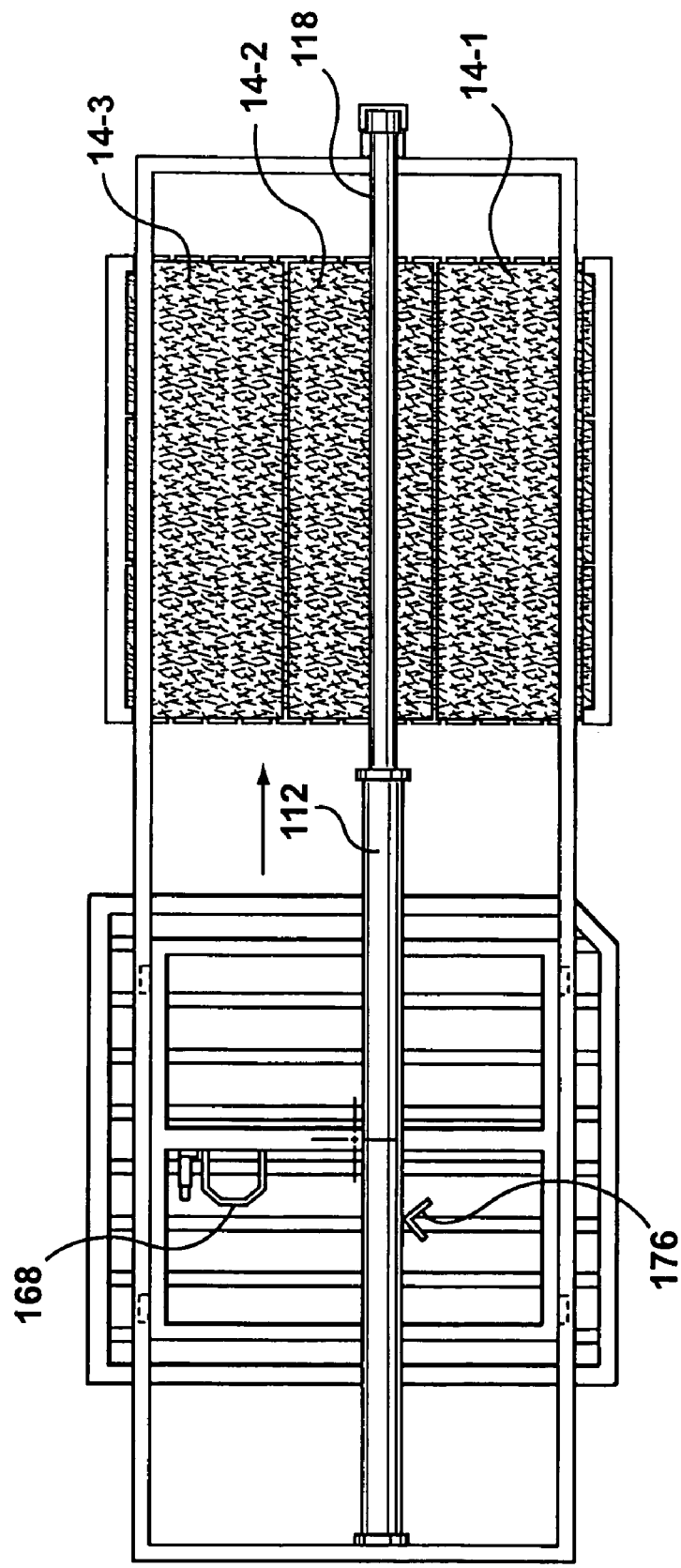
FIG. 9C is a view similar to that of FIG. 9A but showing sod on the pallet in the position in which it was deposited by the sod carrier from the FIG. 9B orientation.

After sufficient time has been provided for the clamps 130 to close and to grip the sod strips (typically only a very short time will be required for this), the computer 144 sends a signal to a solenoid valve in the hydraulic circuit 145 controlling pistons and cylinders 142 to lower the conveyor bed frame 140 so that the third conveyors will be in position to receive the next set of sod strips when they arrive from the second conveyor set 32. The computer 144 then also sends a signal to activate the gantry travel cylinder 112. The gantry 84 then moves to the right as shown in FIG. 9A until the gantry 84 with the sod carrier 94 and the sod strips 14-1 to 14-3 suspended therefrom is over the pallet 90. At this point, a proximity sensor 152 (FIG. 9A) on the guide frame 82 operates, sending a signal to the computer 144 which then stops the operation of cylinder 112, ending further lateral travel of the gantry 84. At the same time (or a few milliseconds later) the computer 144 sends a signal to the hydraulic circuit 145 to operate the clamp piston and cylinder 136 to open the clamps 130, thus allowing the sod strips 14-1 to 14-3 which were suspended from the sod carrier 94 to drop onto the pallet 90. After this operation has occurred, the computer 144 signals the hydraulic circuit 145 to operate gantry cylinder 112 in the opposite direction, to return the gantry and the sod carrier to the position shown in FIGS. 8A and 9A, over the third conveyor set 34 and ready to pick-up another set of sod strips. A proximity sensor 153 at the other (home) end of guide frame 82 signals the computer 144 to stop this return gantry movement when the gantry 84 has returned to its starting (home) position. It will be realized that instead of, or in addition to, raising the conveyor bed frame 140, the sod carrier 94 can be lowered so that the sod strips are contacted by the clamps 130 which press against the sod strips on the third conveyor set 34, to then lift the sod strips.

Figure 12:
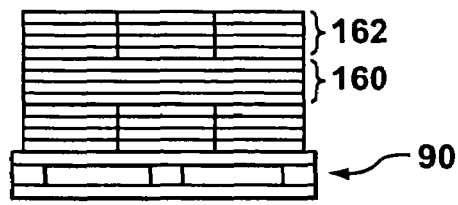
FIG. 12 is a front view of a pallet containing layers of sod placed by the FIG. 1 harvester.

When a pallet 90 is being loaded with sod strips or slabs, then after a number of layers have been deposited with the sod strips oriented in one direction, additional layers can be deposited with the sod strips oriented at 90° to the first direction, to tie together the load of sod strips on the pallet and to render it more stable. A typical loaded pallet 90 is shown in FIG. 12, with four layers of sod strips 160 running in one direction (perpendicular to the page) and the next four layers 162 running at 90° to the first direction. To accomplish this, the sod carrier 94 is, as previously described, mounted on the gantry 84 so that the sod carrier 94 can rotate through 900, powered by piston and cylinder 110. For this purpose, the gantry 84 contains (FIGS. 7, 8A) a home sensor 166 and a home stop 170, while the sod carrier 94 includes a home stop 174 and an away stop 176 and an away sensor 168. When the sod carrier is in the non-rotated position shown in FIGS. 7, 8A, home stop 174 on the sod carrier 94 presses against home stop 170 and home sensor 166 on the gantry. In this condition, the computer 144 is signalled to maintain low pressure in rotate cylinder 110 to hold the sod carrier 94 in the home position shown in FIG. 8A, and not to rotate the sod carrier 94 to a different position.

After a desired number of layers of sod have been deposited on the pallet 90, then the computer will be signalled (by means to be described), after the sod carrier has picked up a load of sod strips to operate the rotate cylinder 110 to rotate the sod carrier 94 by 90° with respect to gantry 84. When the sod carrier 94 has rotated 90°, away sensor 168 on the sod carrier 94 will press against away stop 176 on the gantry 84. The away sensor 168 sends a signal to the computer 144 to terminate the rotation but to maintain low pressure in the rotate cylinder 110 to hold the sod carrier 94 in the 90° rotated position, so that sod strips can be deposited on the pallet 90 at 90° to the first set of sod strips. The computer 144 can be programmed to set as desired the number of layers of sod strips to be deposited on the pallet in one orientation before the next set of layers is deposited at 90° to the first set, and can also be programmed to adjust the number of sod layers deposited in one orientation before a 90° rotation occurs. After the clamps 130 are activated to release the sod, the computer reverses the operation of the rotate cylinder 110 to return the sod carrier 94 to its non-rotated condition (as it returns to its home position).

Figure 13:
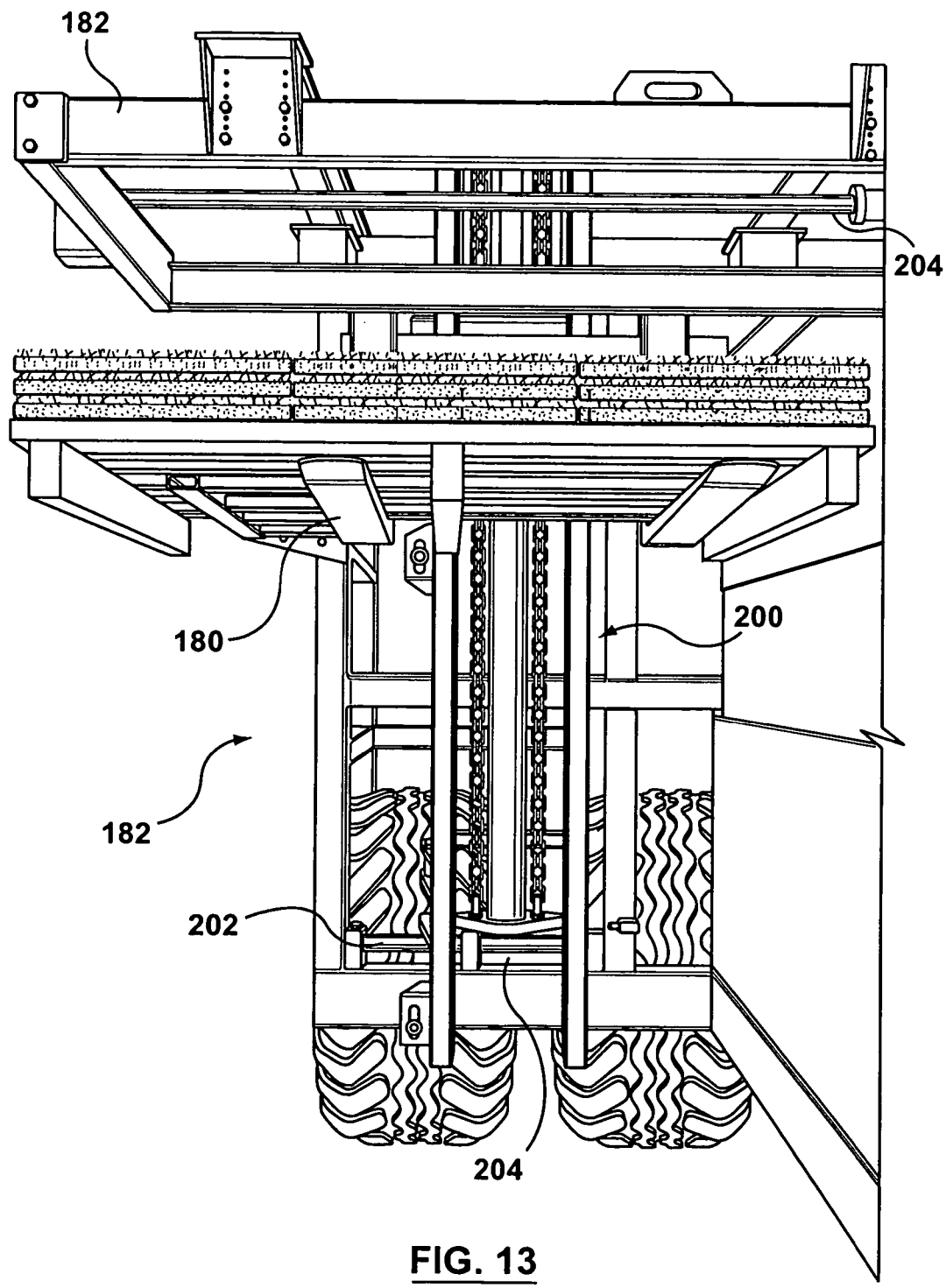
FIG. 13 is a rear perspective view of a portion of the FIG. 1 sod harvester, showing details of the forklift and pallet.
Figure 14:
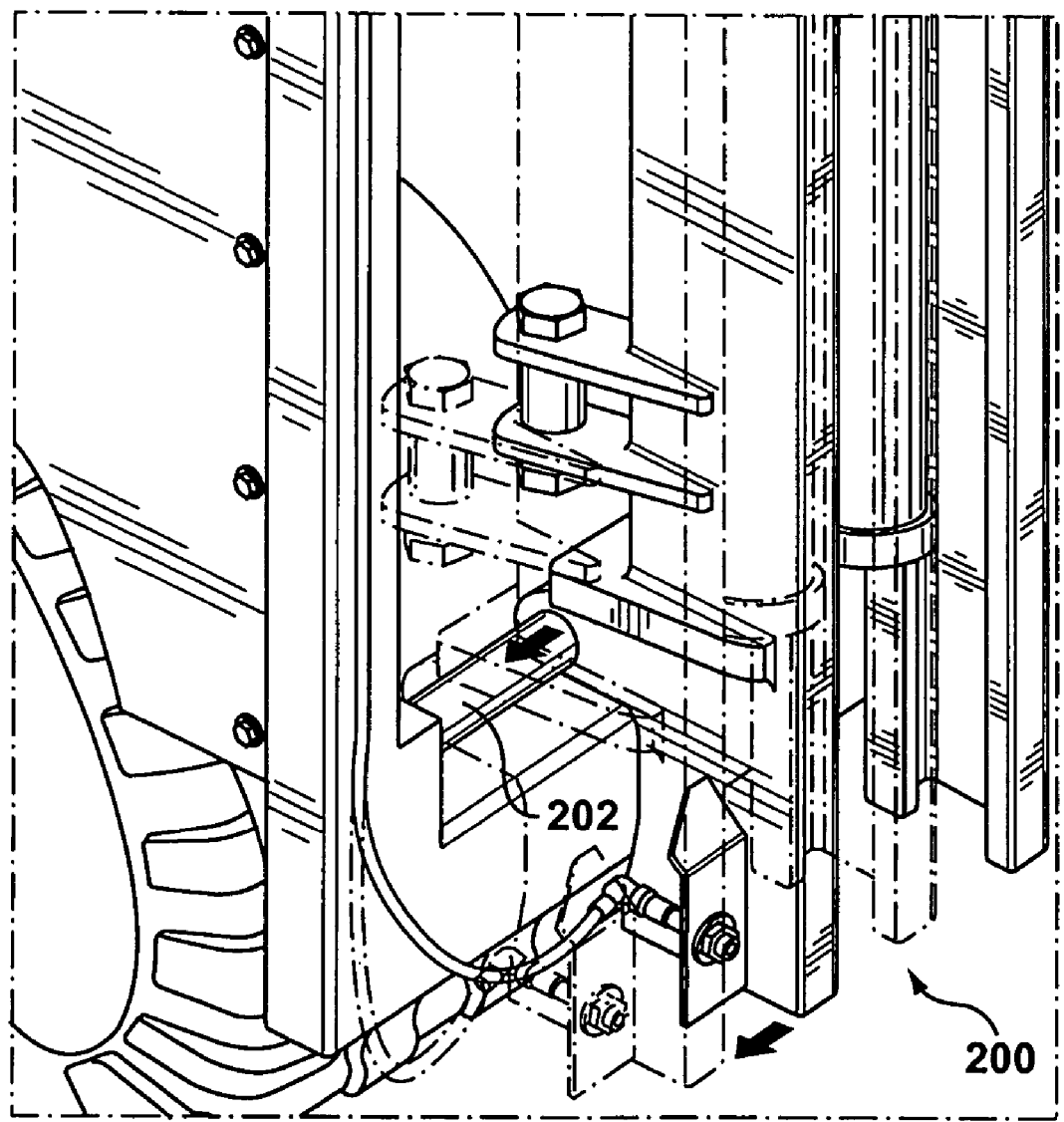
FIG. 14 is a perspective view showing further detail of the forklift of the FIG. 1 sod harvester.
Figure 16:
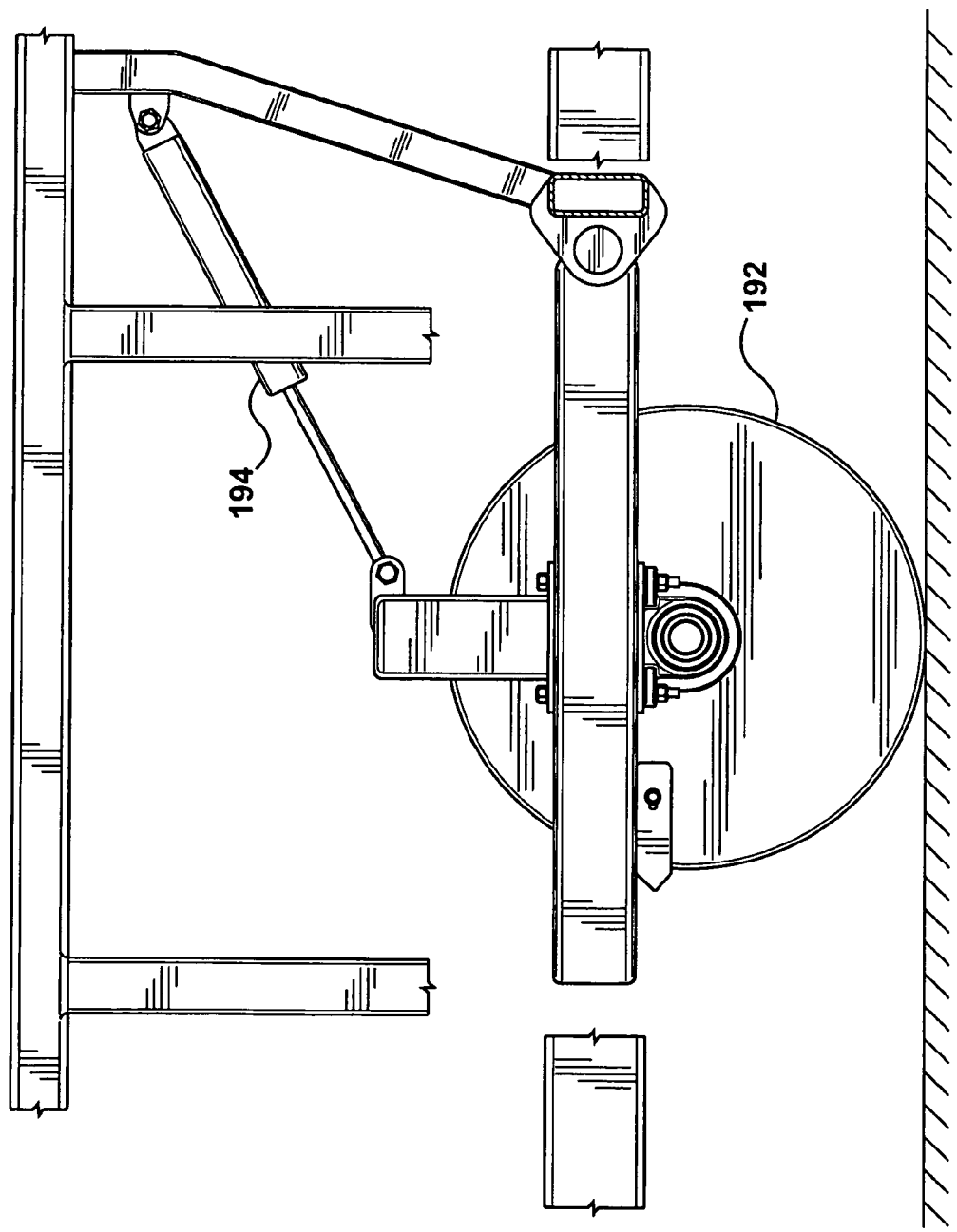
FIG. 16 is a side view showing a rear roller arrangement for the FIG. 1 sod harvester.

The pallet 90 is supported on the forks 180 of a conventional forklift 182 (best shown in FIGS. 13, 14). The forklift 182 is located in a space beside the third conveyor set 34, which space is of sufficient size to accommodate the pallet 90. At the beginning of a sod harvesting operation, the forks 180 are raised upwardly so that the pallet 90 is positioned only a short distance below the sod carrier 94, so that the sod strips when released from the sod carrier will fall only a short distance and will be properly aligned on the pallet 90.

As layers of sod strips are deposited on the pallet 90, the pallet 90 will have to be lowered to make room for the increasing height of the layers stacked on the pallet. The lowering operation is controlled by an "electric eye", consisting of a light beam projector 184 (FIG. 15) mounted at one side of the pallet 90 and projecting its light beam 186 over the upper surface of the pallet to a photocell 188 on the opposite side of the pallet. Signals from the photocell are directed to the computer 144. A brief interruption of the light beam 186 (caused by sod dropping from the sod carrier through the light beam onto the pallet) will not trigger any lowering of the pallet, but a longer duration interruption of the light beam 186 (e.g. one second or more) will cause the photocell 188 to send a signal to the computer 144. The computer 144 then signals the hydraulic circuit 145 to cause the forklift left cylinder 180 to lower the forks 180. The lowering can be by a fixed amount which is approximately equal to the thickness of a sod strip, or it can be until the photocell 188 receives the light beam again from the projector 184, at which time the lowering operation is stopped by the computer 144. The number of lowering steps which occur after the pallet 90 is loaded onto the forks 80 is counted by the computer 144, and when the desired number of lowering steps has occurred, then the computer sends a rotate signal so that the next predetermined number of sod layers will be loaded onto the pallet 90 with the sod strips oriented at 90° to the previous set of layers.

It will be appreciated that for the 90° rotation feature to be effective, the sod carrier must pick-up the sod strips while in one orientation and must then rotate 90° in order to deposit the sod strips (on the pallet) at 90° to the first orientation. Therefore, the sequencing by the computer 144 is such that when the sod carrier 94 is positioned over the third conveyor set 34, the sod carrier 94 is always in the "home" position indicated in FIGS. 7 and 8A. The gantry 84 with the sod carrier 94 suspended therefrom can then travel to the "away" position shown in FIG. 9B, with the sod carrier 94 either in the FIG. 8A position, or rotated through 90° therefrom. The two alternative "away" positions of the sod carrier 94 can be referred to as the "unrotated away position" and the "rotated away position". The sod carrier 94 must be fully in one of these two positions before the computer 144 will signal the hydraulic circuit 145 to open the clamps 130 and drop the sod strips onto the pallet 90. Therefore, the signals from the proximity sensor 152 indicating that the gantry 84 has fully reached the "away" position, and from the sensors 166, 168 indicating that the sod carrier is fully either in the unrotated away position or in the rotated away position, are required before the clamps 130 are opened to release the sod strips.

Figure 15:
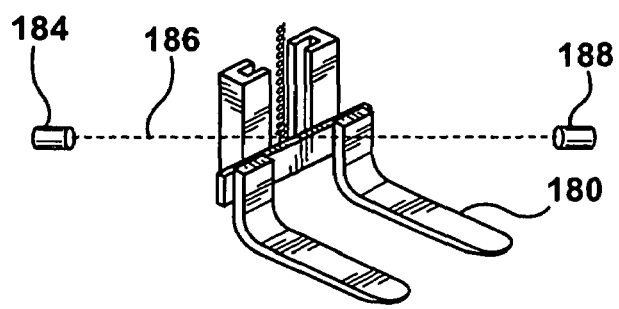
FIG. 15 is a simplified perspective view showing portions of the forklift of the FIG. 1 sod harvester with an electric eye level adjusting mechanism.

It will be appreciated that the gantry 84 must travel back and forth rapidly, and that the sod carrier must rotate rapidly, to complete their required movements in the relatively short time period available between the arrivals of successive sets of sod strips. The resultant rapid accelerations and decelerations can heavily shake the sod harvester 10. To reduce this tendency, the sod harvester 10 is supported at its rear end, beneath the third set of conveyors 34, by a heavy roller 192 (FIG. 15). The roller 192 serves to dampen and reduce the amplitude of vibrations occurring when the gantry and sod carrier are accelerating and decelerating. The roller 192 also helps to support the load of the harvester, particularly when it is carrying a pallet loaded with sod and a stack of empty pallets, and also serves better to balance the machine. A piston and cylinder 194 can be provided to adjust the weight division between the roller 192 and the rear wheels 196 of the harvester, and also to raise the roller 192 off the ground when the cutting knives are raised from the ground, so that the harvester 10 can travel.

In place of roller 192, a set of wheels of a suitable hardness may be used.

When the pallet 90 is full of sod and is ready to be discharged, it is preferred that it be placed on the ground in a position in which it will be out of the path of the return movement of the sod harvester during a harvesting operation. Therefore, the forklift mast 200 is preferably mounted on a rod 202 (FIGS. 13, 14) and can be side shifted using a side shift piston and cylinder 204, as is well-known in the industry, so that before the pallet 90 is lowered onto the ground, it is side shifted as far as possible to one side of the harvester.

The foregoing description has discussed harvesting three side-by-side strips so that a complete layer for the pallet can be picked up and deposited on the pallet, thus eliminating the need for separate movements to build up a layer on the pallet from separate pieces. Transferring an entire layer onto the pallet is more efficient than transferring only part of a layer, although if desired, the features of the invention can be used to transfer part of a layer in one operation and then to transfer further parts of the layer in additional operations.

If the harvester 10 is used to harvest only a single wide slab or strip of sod and then send that strip up conveyors to be picked up and placed on a pallet, then variations can be made in the apparatus described. For example, while three sequential sets of conveyors are still desirable, with each travelling faster than the preceding set to produce a gap or time interval between the times when successive pieces of sod arrive at the buffer conveyor (i.e. at the third conveyor), it may be less necessary to have the third conveyor travelling faster than the second conveyor, since the gap produced by the differences in speed between the first and second conveyors may be sufficient for sod pick-up and deposit operations. In any event, while a one/two/three speed ratio is preferred for the three conveyor sets (i.e. ground speed for the first set, double ground speed for the second set, and three times ground speed for the third set), these speeds can be varied depending on the need, so long as a sufficient time interval is produced between the arrivals of successive sets of sod pieces to allow the set on the buffer conveyor or conveyors to be picked up. Also, additional conveyor sets can be included in the sequence, either for further movement of the sod, or to increase the size and duration of the gap between sod strips arriving at the buffer conveyor, or both.

Figure 17:
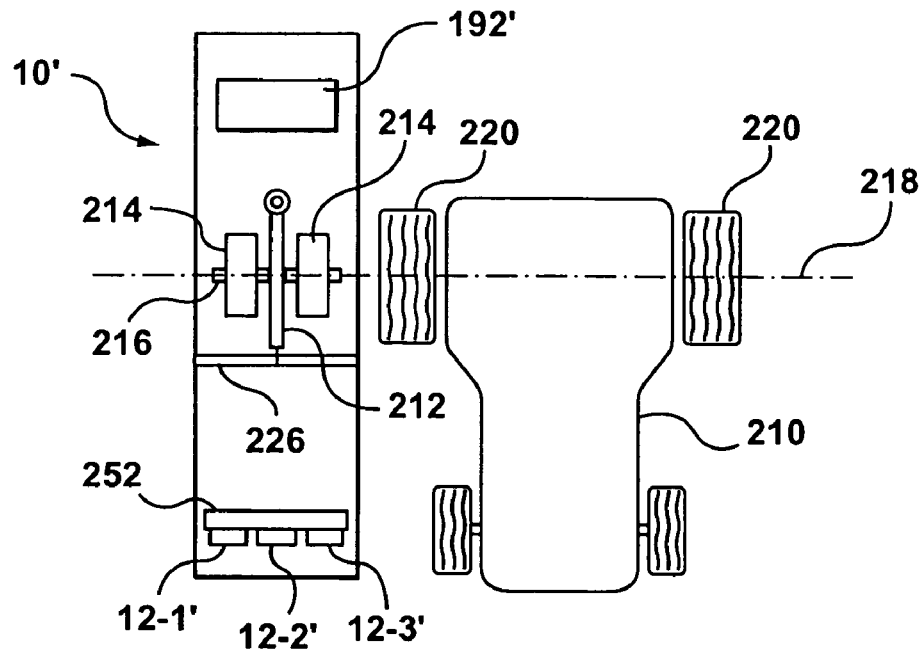
FIG. 17 is a diagrammatic view of another embodiment of the harvester according to the invention, mounted on the side of a tractor.
Figure 18:
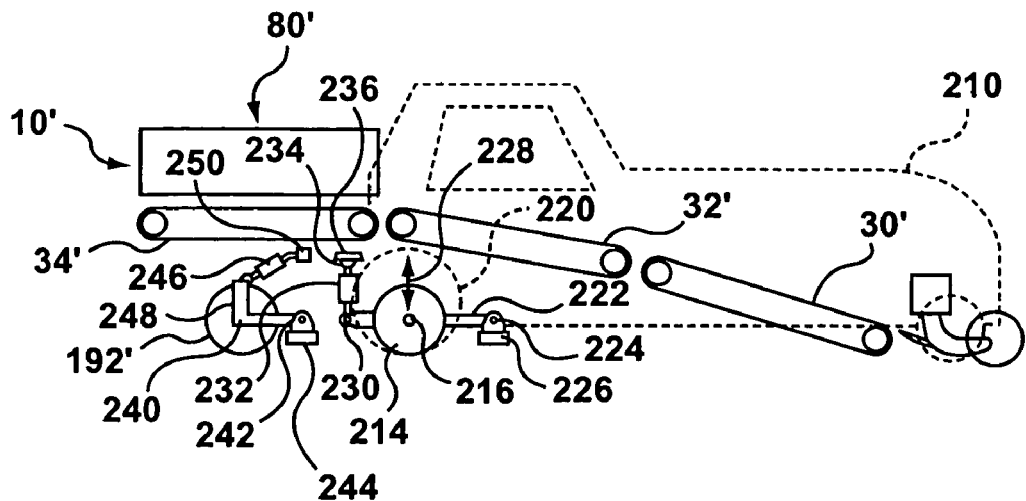
FIG. 18 is a side view of the tractor and harvester of FIG. 17.

Reference is next made to FIGS. 17 and 18, which show diagrammatic views of a sod harvester according to the invention mounted on the side of a tractor, rather than being pulled by a tractor. Prime reference numerals are used to indicate parts corresponding to those of FIGS. 1 to 16.

The sod harvester 10' shown in FIGS. 17, 18 is essentially the same as that shown in the preceding FIGS., with respect to the components used to harvest sod, move it upwardly and rearwardly along three sets of conveyors 30', 32', 34', and then pick up the sod slabs using the sod pick-up and transfer mechanism 80'. However, the harvester 10' is now mounted on the side of a tractor 210, employing a conventional mounting mechanism (not shown).

The feature of particular interest in the harvester 10' is the use of "bogie" wheels 214 which help to support the harvester. If the harvester is designed to cut a wide set of sod slabs, then the harvester will be heavy and needs the bogie wheels for support. As shown in FIGS. 17, 18, the bogie wheels 214 are mounted on an axle 216 which has its axis aligned (in a front to rear direction) with the axis of axle 218 of the tractor rear wheels 220. (As shown in FIG. 18, since bogie wheels 214 are of smaller diameter than the tractor rear wheels 220, the bogie axle 216 is not aligned in a vertical direction with axis 218 of the tractor rear wheels, i.e. axle 216 is below axle 218.)

The bogie wheels 214 are not fixed immovably to the harvester 10', but rather are mounted on a suspension comprising a beam 222 extending in a front to rear direction and supporting the axle 216. The front end of beam 222 is mounted at pivot 224 on a cross beam 226 of the harvester 10', so that the harvester bogie wheels 214 can move upwardly and downwardly in the direction of arrow 228.

The rear end of beam 222 is pivotably connected at 230 to a piston and cylinder 232, the upper end of which is connected at pivot 234 to another cross beam 236 of the harvester 10'.

With the arrangement shown, a desired amount of pressure can be applied to the bogie wheels 214, using piston and cylinder 232, to support a portion of the weight of the harvester. Appropriate damping means (similar to a shock absorber) can if desired be incorporated into piston and cylinder 222, to absorb shocks and provide some resiliency as the harvester 10' travels over undulating ground. In fact, piston and cylinder 222 can be a shock absorber, pressurized with air. In addition, other suspension arrangements can be used, e.g. a piston and spring combination.

Similar to the previous embodiment, the axle of the rear roller 192' is supported by a beam 240 pivotably mounted at 242 to a fixed member 244 of the harvester. A piston and cylinder 246 pivotably connected between an extension 248 of the beam 240 and a fixed member 250 of the harvester allows a desired amount of pressure to be transferred to the rear roller 192'. In addition, as before, when the cutting knives of the harvester 10' are raised out of the ground, the rear roller 192' will normally also be automatically raised above the ground by piston and cylinder 246, to allow for travel of the harvester 10'. During such travel, the weight of the harvester 10' will be supported by the tractor 210 and by the bogie wheels 214.

While the cutting knives 12-1', 12-2', 12-3' have been shown in fixed relation, they can if desired be made adjustable. For example, as shown in FIG. 17, the right hand cutting knife 12-3' can be fixed to the harvester, but the two left hand cutting knives 12-1' can be made adjustable in a side-to-side direction, e.g. by mounting them on a beam 252 with a number of sets of mounting holes, so that the knives 12-1', 12-2' can be bolted to beam 252 using one of several available sets of mounting holes for each knife. In this way, the size of the narrow sod strip to be left in the field for regrowth after sod slabs have been cut and removed, can be varied depending on the sod grower's preference. In FIG. 17, the sod cutting knives 12-1' to 12-3' have been shown as aligned in a front to rear direction, which assumes a moderate spacing between the sides of the sod slabs being cut. If a zero spacing is desired (as previously described), then the center knife 12-2' can be offset forwardly or rearwardly, as previously discussed.

Figure 19:
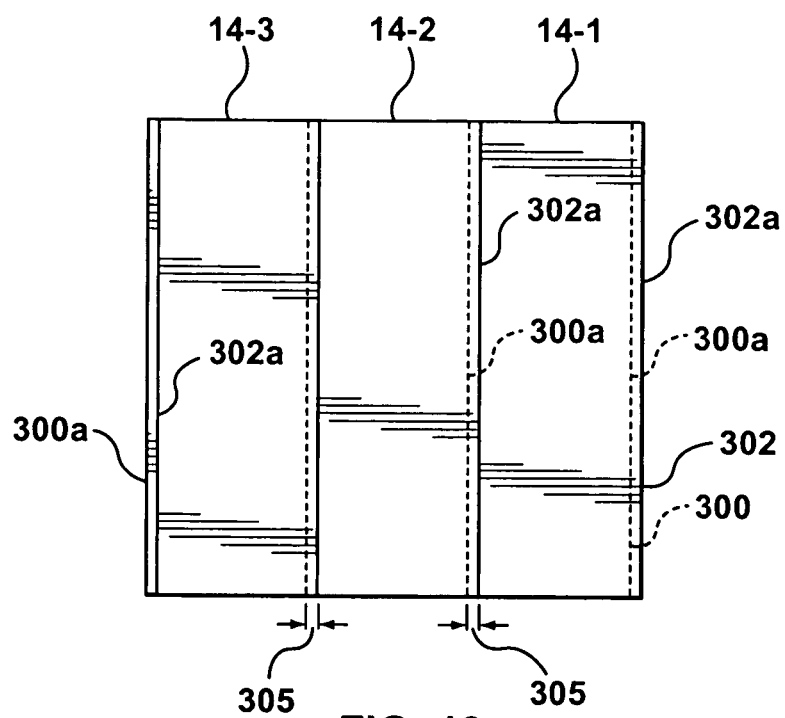
FIG. 19 is a top view of a sod layer stacked on a pallet according to an aspect of the invention.
Figure 20:
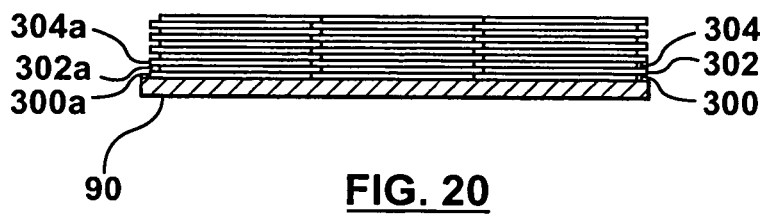
FIG. 20 is an edge view of the sod stack of FIG. 19.
Figure 21:
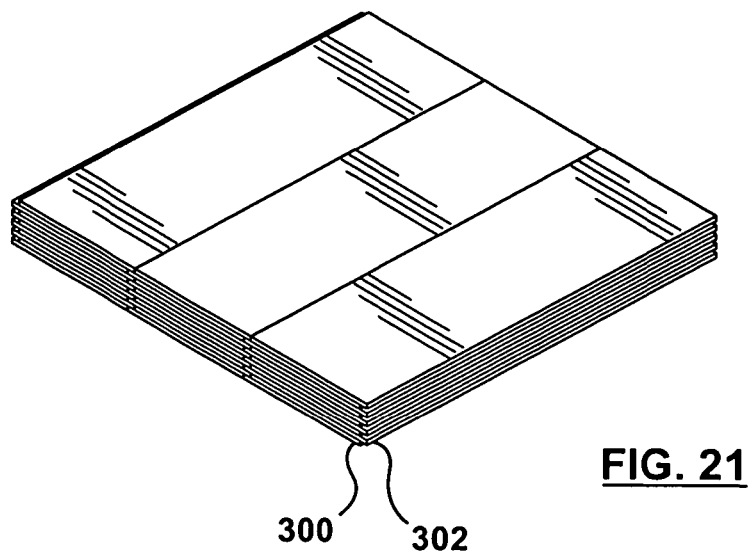
FIG. 21 is a perspective view of the sod stack of FIGS. 19 and 20.

Reference is next made to FIGS. 19 to 21, which show a different way of stacking sod on a pallet from that shown in FIG. 12, but which also serves to tie the stacked sod on the pallet together. As shown in FIGS. 19 to 21, a first layer 300 consisting of three sod strips is deposited on the pallet 90. A second layer 302 also consisting of three sod strips is then deposited on top of the first layer 300, but layer 302 is offset sideways by a small amount (e.g. one inch to two and a half inches, or more if desired) with respect to layer 300. Then the next layer 304 is deposited on top of layer 302, but with the side edges 304a of layer 304 aligned with the side edges 300a of the first layer 300 and therefore overlapping the side edges 302a of layer 302. The overlap is indicated at 305 in FIG. 19. As successive layers are stacked, each layer overlaps the side edges of the sod strips on the layer beneath it. The weight of the sod pressing on the overlapped portions ties the slabs of sod together when stacked on a pallet and makes unnecessary the need for rotating sets of layers through 90°, as described in connection with FIG. 12. This eliminates the need for the rotating mechanism of the sod carrier 94, thus substantially simplifying the apparatus.

To practice the method described in connection with FIGS. 19 to 21, the proximity switch 152 (FIG. 9A) which controls the position at which the sod carrier 94 ends its sideways travel and drops a layer of sod onto the pallet 90, can be modified to sense the two overlapped positions required, or alternatively (and preferably) the computer 144 may be programmed simply to allow (for example) one inch or more of additional movement of the sod carrier 94 on each alternating trip of the sod carrier 94 over the pallet 90.

Another way to practice the method described in connection with FIGS. 19 to 21 is to use the feature that the forklift 182 has a side shift piston and cylinder 204 (FIG. 13). The side shift piston and cylinder 204 may be controlled by the computer 144 to shift the pallet 90 sideways by the required distance (e.g. one to two and a half inches, or more) just before the sod carrier 94 drops a layer of sod on the pallet 90, so that alternating layers are overlapped as described.

In addition, instead of offsetting alternating layers (in which case each layer is offset with respect to the layer beneath it), such offsetting can be done every third layer, or every fourth layer, or as desired, so long as the stack of layers are adequately tied together on the pallet 90.

Figure 22:
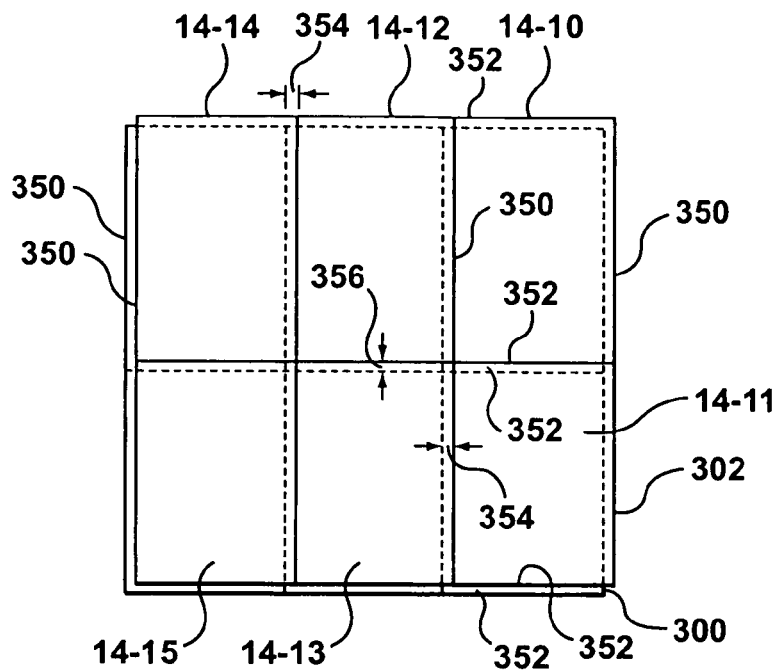
FIG. 22 is a top view of another set of sod layers stacked on a pallet.
Figure 23:
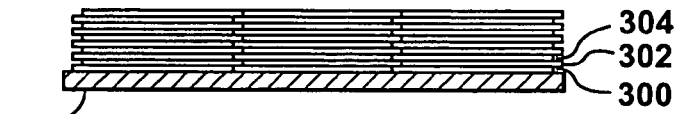
FIG. 23 is an edge view of the sod stack of FIG. 22.
Figure 24:
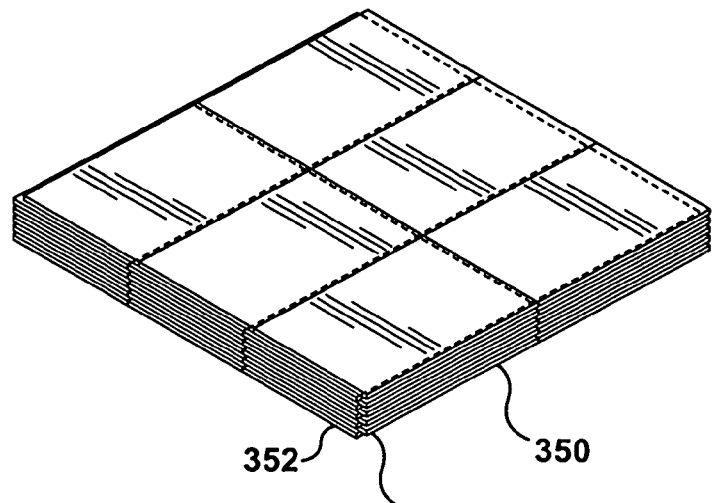
FIG. 24 is a perspective view of the sod stack of FIGS. 22 and 23.

Reference is next made to FIGS. 22 to 24, which show the situation when each sod strip 14-1 to 14-3 is cut into two pieces by a cross cut knife such as knife 146 of FIG. 4D. In the example illustrated, this results in six sod pieces 14-10 to 14-15 inclusive. Each piece has a pair of longitudinal edges, indicated at 350, and a pair of lateral or widthwise edges, indicated at 352. When these layers are stacked on a pallet, overlap can be provided both widthwise (as also shown in FIGS. 19 to 21) and lengthwise (in which case at least some of the widthwise edges 352 are overlaid by the sod above them).

The overlapping of the longitudinal edges 350 can be accomplished, as described for FIGS. 19 to 21, by programming the computer 144 to cause the sod carrier 94 to travel to different positions over the pallet 90 as alternate layers of sod are deposited. Thus, using the signal from proximity switch 152, and under control of computer 144, the sod carrier 94 alternatingly deposits the sod on the pallet 90 in two positions, one overlapping the other by between one and two and a half inches (all dimensions are exemplary) to provide the widthwise overlap indicated at 354 (FIG. 22).

The lengthwise overlap of the widthwise edges 352, such overlap being indicated at 356 in FIG. 22, may be provided in various ways. One method, as shown in FIGS. 25 to 29, is to mount the forks 180 on the forklift mast 360 by a scissors mechanism diagrammatically indicated at 362. The scissors mechanism 362 may be operated in conventional manner by a piston and cylinder (not shown) to move the forks 180 in a lengthwise direction, towards and away from the mast 360 as shown in FIGS. 25 to 28. This movement will shift the sod pieces in a lengthwise direction, producing the lengthwise offset or overlap indicated at 356 in FIG. 22. Again, operation of the scissors mechanism 362 is controlled by computer 144, so that the correct movement occurs at the correct time. The amount by which the scissors are extended can be controlled by a microswitch or a proximity sensor, not shown.

As described in connection with FIGS. 19 to 21, the lengthwise overlap 356, as well as the widthwise overlap, can be of every alternate layer, or every second, third or fourth layer, or as desired so long as the stacks of sod pieces are tied together sufficiently to result in a stable pile of sod on the pallet 90.

Figure 25:
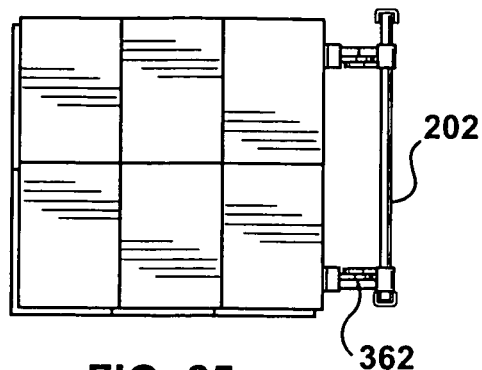
FIG. 25 is a top view showing sod on a pallet on forks having a scissors connection to the forklift mast.
Figure 27:
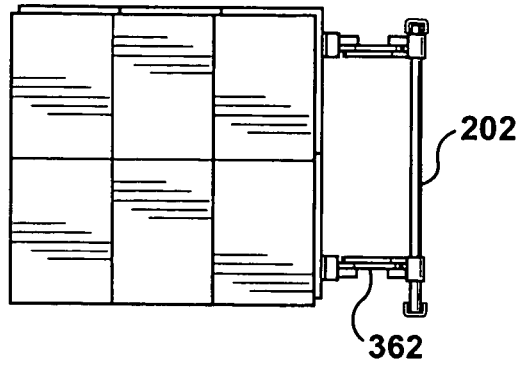
FIG. 27 is a top view similar to that of FIG. 25 but with the scissors extended.
Figure 26:
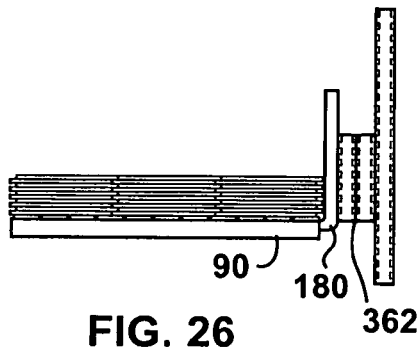
FIG. 26 is a side view of the arrangement of FIG. 25.
Figure 28:
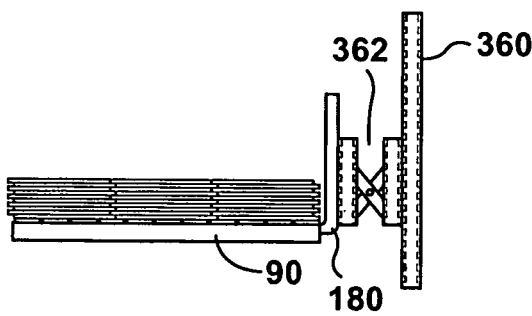
FIG. 28 is a side view of the FIG. 27 arrangement.

FIGS. 25 and 26 show the scissors 362 retracted and the forks side shifted right, while FIGS. 27 and 28 show the scissors 362 extended and the forks side shifted left.

Figure 29:
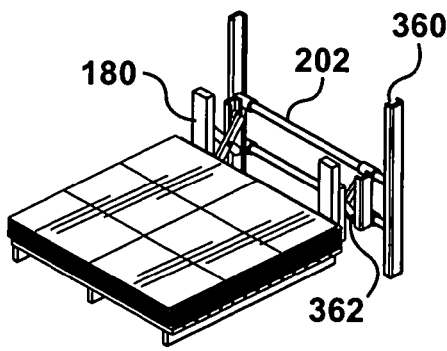
FIG. 29 is a perspective view of the FIG. 25 arrangement.
Figure 30:
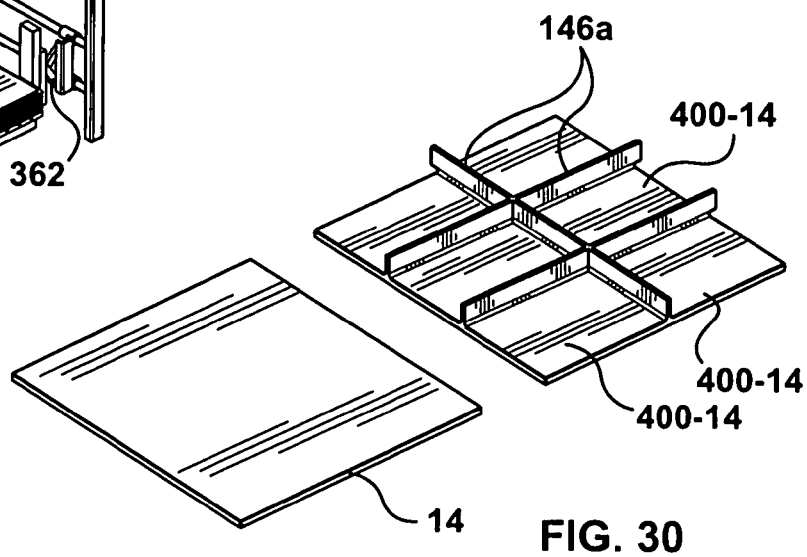
FIG. 30 is a perspective view of a sod slab and knives for cutting the sod slab into a number of pieces.

In some cases, the harvester may cut a single wide sod strip 14, as shown in FIG. 29, and such wide sod strip may then be cut into desired pieces 400-14 by knives 146A (similar to knife 146) located in the bottom of the sod carrier 94. As before, the cutting occurs when the conveyor bed frame 140 carrying the sod strip 14 is pressed against the bottom of the sod carrier 94 (or when the sod carrier 94 is pressed against the third set conveyors 34 on the bed frame 140). The sod piece 14 can in this manner be cut into any desired number of pieces, e.g. two pieces, three pieces, four or six pieces. Stacking of these pieces may be performed as described for FIGS. 19 to 24, with each layer offset in a widthwise (lateral direction) as described for FIGS. 19 to 21, and if the sod slab is cut crosswise into several pieces in a lengthwise direction, then the overlap will also be as described for FIGS. 22 to 24, i.e. in a front to rear (lengthwise) direction.

Reference is next made to FIGS. 31 to 37A, B, C which show diagrammatically an automatic pallet injector 400 according to the invention, to enable the harvester to cut sod continuously without having to stop to eject a completed sod stack and load a new pallet. It will be appreciated that if the harvester has to stop each time a loaded pallet is to be discharged, then use of the harvester will be much less efficient than if continuous operation were possible.

Figure 31C:
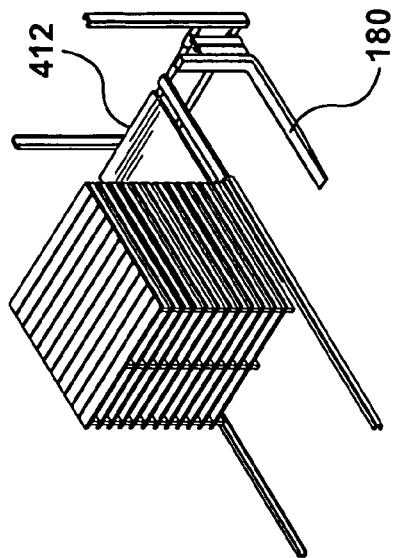
FIG. 31C is a perspective view of the FIG. 31A arrangement.
Figure 31A:
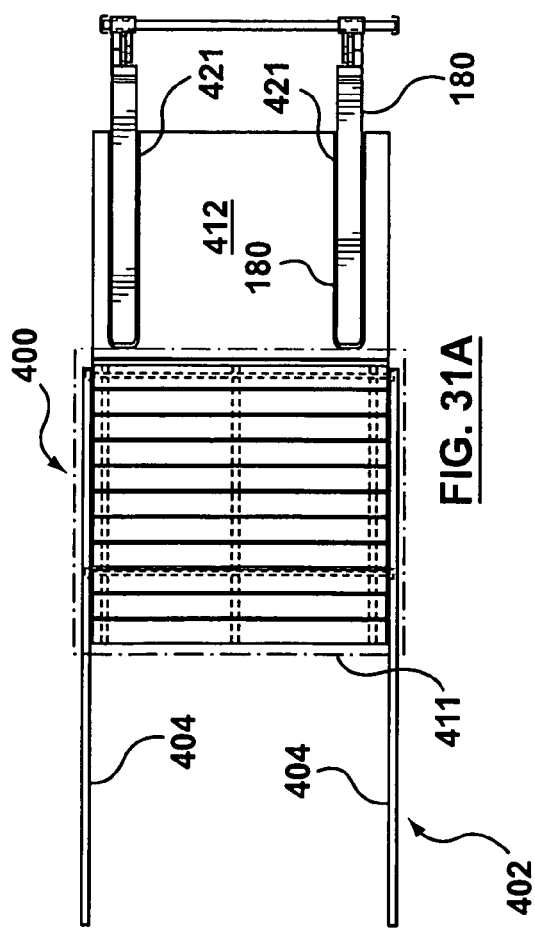
FIG. 31A is a top view of a pallet injector for supplying a pallet to the forklift of the FIG. 1 harvester, and also showing the forklift, in idle condition.
Figure 31B:
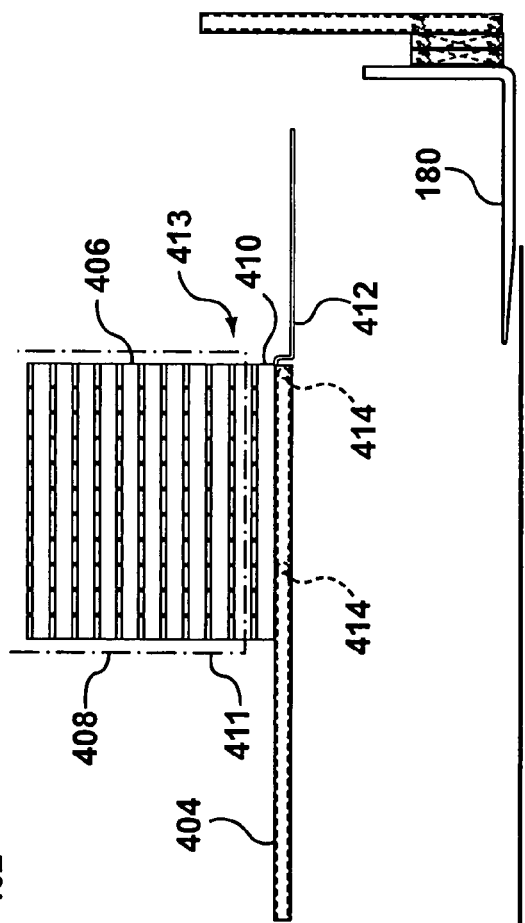
FIG. 31B is a side view of the FIG. 31A arrangement.

As shown in FIGS. 31A, B, C, the pallet injector 400 includes a pallet support structure 402 comprising a set of support rails 404. The rails 404 are spaced laterally apart to carry a stack 406 of pallets. The stack 406 of pallets is normally confined in a hopper shown in dotted lines at 408. The rails 404 and the bottom pallet 410 in the stack are located beneath and clear of the bottom of the hopper 408.

Figure 32C:
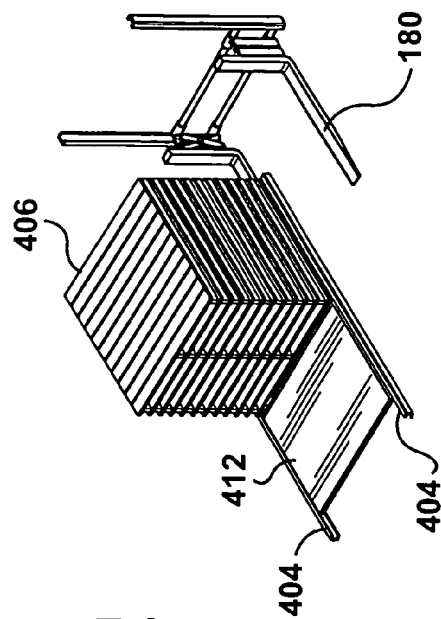
FIG. 32C is a perspective view of the FIG. 32A arrangement.
Figure 32A:
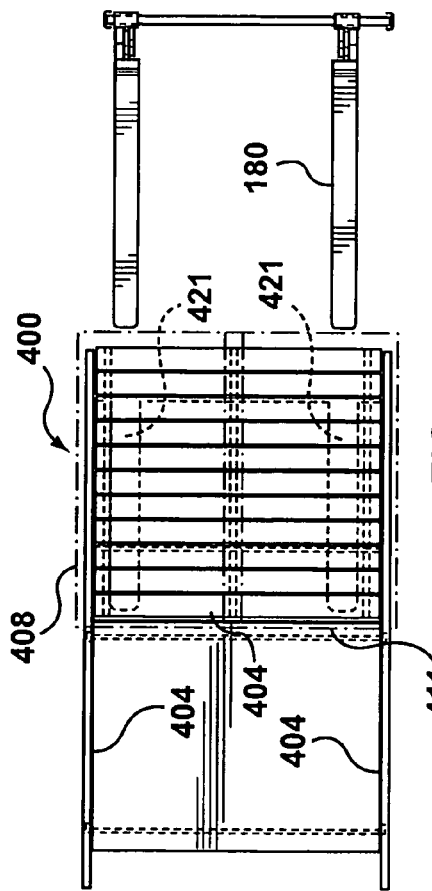
FIG. 32A is a top view similar to FIG. 31A and showing the pallet dispenser pulled back.

The rails 404 support an injector sheet 412 which in turn supports the bottom pallet of the stack 406 and is movable on wheels 414 rolling on rails 404 between an extended position shown in FIGS. 31A, B, C and a retracted position shown for example in FIGS. 32A, B, C. In the retracted position, the injector sheet 412 is located over the rails 404 and does not protrude beyond the front edge 413 of the hopper 408. Any desired mechanism, e.g. pistons and cylinders (not shown) can be used to move the injector sheet 412 between its extended and retracted positions. Injector sheet 412 can also move on slides or in any other known way. Proximity sensors or microswitches (not shown) control the extent of the extension and retraction of the injector sheet 412, by sending position signals in conventional manner to computer 144.

In FIGS. 31 to 34A, B, C, the forks 180 are in a lowered position (it is assumed that they have just discharged a pallet loaded with sod). In FIGS. 32A, B, C, the injector sheet 412 is in its retracted position, and in FIGS. 33A, B, C, the injector sheet 412 is shown in its extended position, supporting a pallet 410 over the forks 180. The injector sheet 412 may typically include small barbs or the like, e.g. crosswise bars or tubes (not shown) to grip the bottom of the bottom pallet 410 and move it forwardly, out from under the remaining pallets in the stack 406. Movement of the remaining pallets in stack 406 is prevented by the walls of the hopper 408 in which they are located.

After the bottom pallet 410 has been dispensed from the stack 406 of pallets and is located over the forks 180, the pallet 410 is temporarily supported by the injector sheet 412 while stacking of sod pieces on pallet 410 begins. It is necessary for injector sheet 412 to temporarily support the pallet 410 at this time, since the forks 180 will have just finished supporting a previously fully loaded pallet of sod and are not yet available to hold a new pallet. Since the harvester is continuing to harvest sod and needs to stack the newly harvested sod without interruption, therefore the required temporary support of pallet 410 is provided by the injector sheet 412.

Figure 34C:
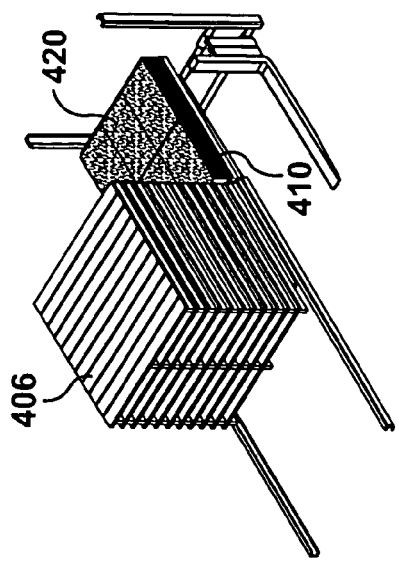
FIG. 34C is a perspective view of the FIG. 34A arrangement.
Figure 34A:
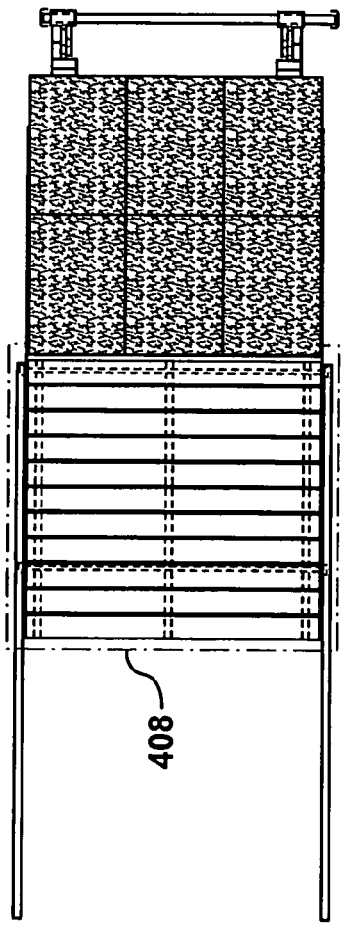
FIG. 34A is a top view of the FIG. 31A arrangement, with a pallet supported by the pallet injector over the forks and sod stacked thereon.
Figure 34B:
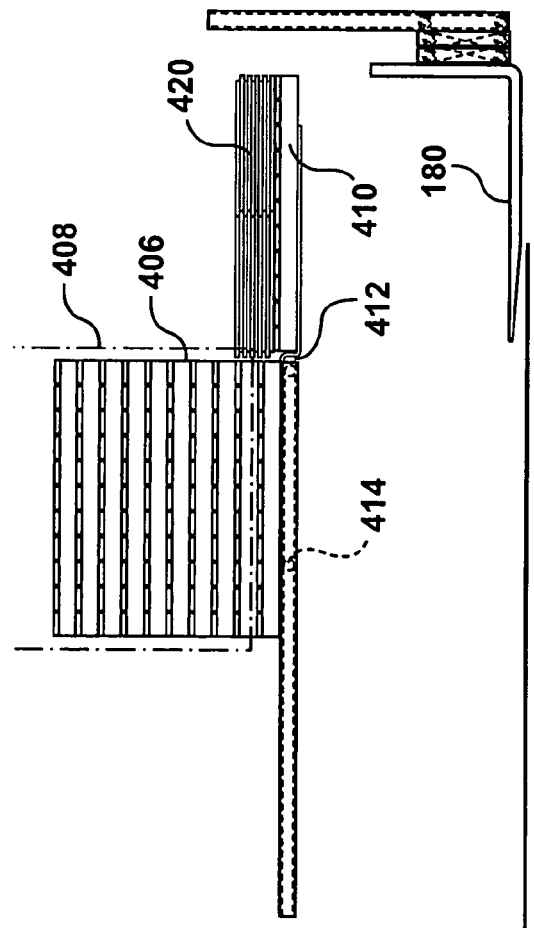
FIG. 34B is a side view of the FIG. 34A arrangement.
Figure 37C:
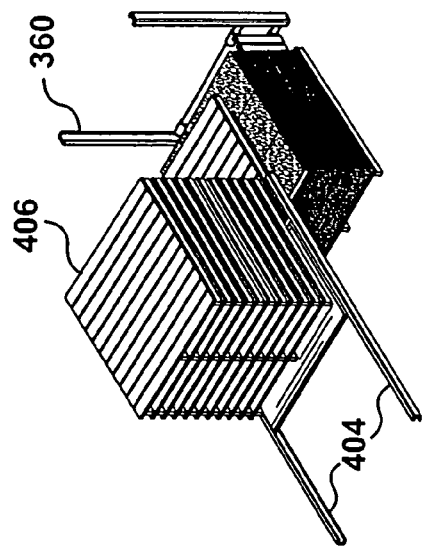
FIG. 37C is a perspective view of the FIG. 37A arrangement.
Figure 37A:
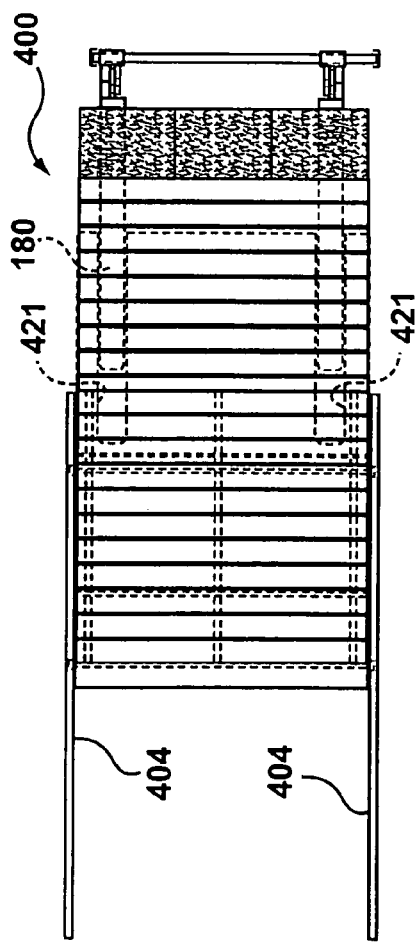
FIG. 37A is a top view of the FIG. 31A arrangement, with the pallet injector having pushed a new pallet over the forks for loading, and with a loaded pallet still on the forks.
Figure 37B:
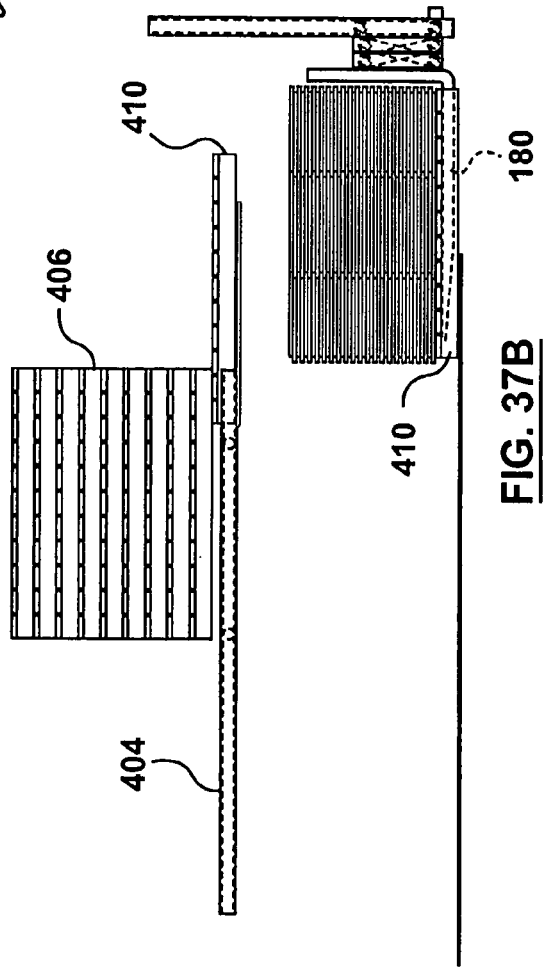
FIG. 37B is a side view of the FIG. 37A arrangement.

FIGS. 34A, B, C show the pallet 410 supported temporarily by the injector sheet 412 and with the first two, three or four (or more) layers of sod 420 stacked on the pallet 410. The forks 180 are still shown in their lowered position.

FIGS. 35A, B, C show the forks 180 in raised position in which they have now taken over the job of supporting the pallet 410, with several layers of sod 420 thereon. As will be evident from FIGS. 31 to 33A, the injector sheet 412 contains laterally spaced apart slots 421 through which the forks 180 can pass, so the forks can take over supporting the pallet from the injector sheet 412. Although injector 412 has been shown as a sheet, separate tubes or rods can be used if desired to form the injector and to provide sufficient temporary support for the partly loaded pallet 410. When the forks 180 take over the job of supporting the pallet 410, they raise the pallet above the position in which it was formally supported by the injector sheet 412, by about two inches. The precise amount by which the forks lift the pallet above the injector sheet can be varied, but should be enough to ensure that the pallet is above the injector sheet 412 and does not obstruct withdrawal of the injector sheet 412 to its retracted position.

Figure 32B:
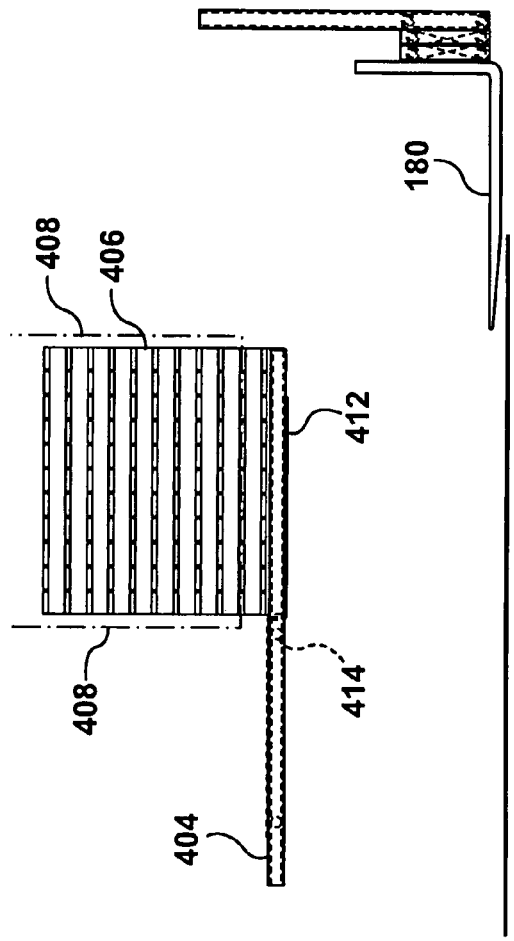
FIG. 32B is a side view of the FIG. 31A arrangement.
Figure 33C:
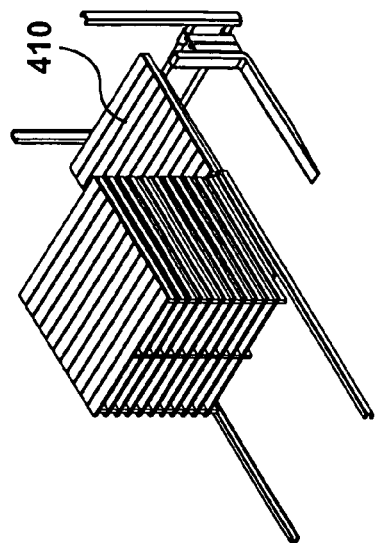
FIG. 33C is a perspective view of the FIG. 33A arrangement.
Figure 33A:
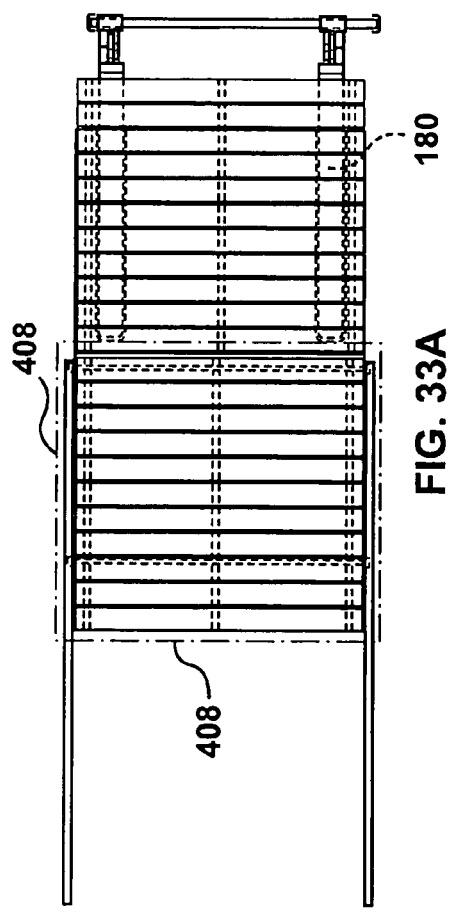
FIG. 33A is a top view of the FIG. 31A arrangement, with the pallet dispenser having pushed a pallet over the forks.
Figure 33B:
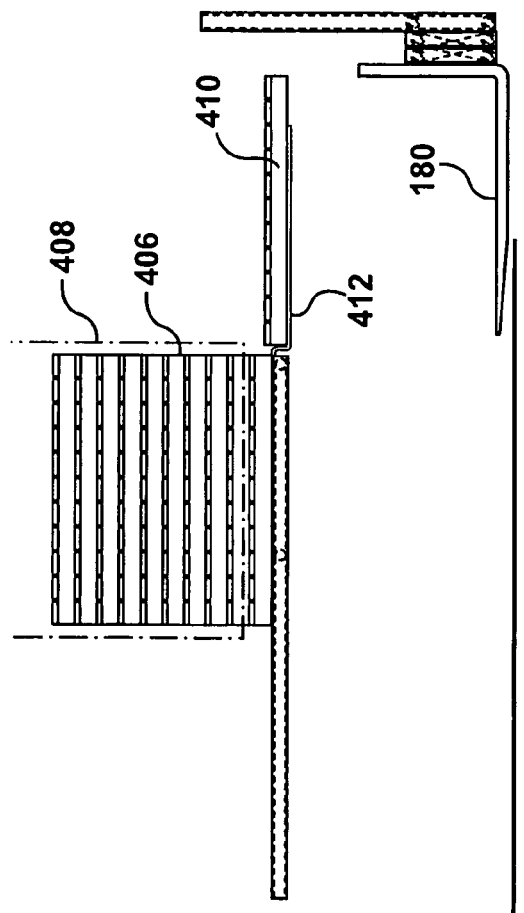
FIG. 33B is a side view of the FIG. 33A arrangement.

Once the. forks 180 have taken over the task of supporting the loaded pallet 410, the injector sheet 412 may be withdrawn to its retracted position (shown for example in FIGS. 32, 36A, B, C). The harvester 10 then continues to stack sod on the pallet 410 until the pallet is fully loaded, as previously described, at which time the electric eye 184, 188 (FIG. 15) causes the computer 144 to control the forks 180 to lower the fully loaded pallet 410 to the ground for discharge (FIGS. 36A, B, C). When the pallet 410 is lowered to the ground, then since it is facing rearwardly, it will be discharged as the harvester moves forwardly away from it. Downward movement of the forks 180 at this time is terminated by a proximity sensor 421 at the bottom of the fork mast. Sensor 421 signals the computer 144 to end lowering of the forks at this time. After the loaded pallet has been discharged from the forks 180 (the computer provides a short time interval for this after proximity sensor 421 has been activated to stop the lowering of the forks), then the computer 144 causes the forks to be raised again, to support a new pallet which has been injected.

A second electric eye sensor, shown in FIG. 35C as having a light beam projector 422 and a photocell 424, is located below the electric eye 184, 188. Electric eye 422, 424 senses when the top of the finished sod stack passes photocell sensor 424 on the travel of the finished sod stack down to the ground. The signal from the second electric eye 422, 424 is transmitted to the computer 144 to inform the computer that the top of the loaded pallet being lowered is now below the level of the injector sheet 412. The computer then actuates the injector sheet 412 to remove a new pallet from the bottom of the stack 406 and to move it forward into the sod stacking position shown for example in FIGS. 34A, B, C. As described, the injector sheet 412 remains in its extended position and supports the new pallet 410 for stacking of the first two or more layers of sod, to allow time for the previous sod laden pallet to be ejected and for the forks 180 to rise back up to support the new pallet 410. The upward travel of the forks 180 at this time may be controlled and stopped by a proximity sensor, diagrammatically indicated at 426, on the mast 360. As mentioned, the forks are stopped after they have raised the new pallet 410 clear of the injector sheet, to allow the injector sheet to be withdrawn. A sequence detector function in the computer 144 detects that the upward movement of the forks has terminated, and then signals the injector sheet 412 to return to its retracted position shown, for example, in FIGS. 32A, B, C.

The proximity sensor or microswitch (not shown) which terminates the movement of the pallet injector sheet 412 back to its retracted position, also signals or enables the start of the first set 184, 186 (FIG. 15) of electric eyes' function to lower the forks 180 during stack building as required. (It will be understood that the forks 180, when they are supporting a loaded pallet, should not be lowered until after the injector sheet 412 has been fully retracted, so that the pallet does not interfere with the injector sheet retraction.)

While the lowering of the fully loaded pallet during stack building has been described as initiated by the first electric eye set 184, 185, such lowering can be accomplished in other ways. For example, the computer 144 can count the layers deposited on the pallet by the sod carrier, and after the count has reached (for example) 30 to 35 layers, then lowering of the loaded pallet can be initiated.

Figure 38:
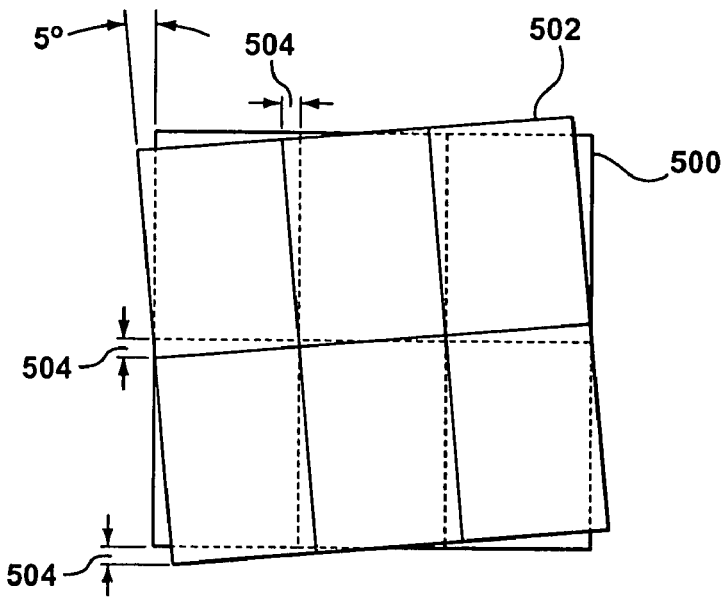
FIG. 38 is a plan view of cut slabs of sod on a pallet, and showing each layer rotated by a few degrees with respect to the layer below it.
Figure 39:
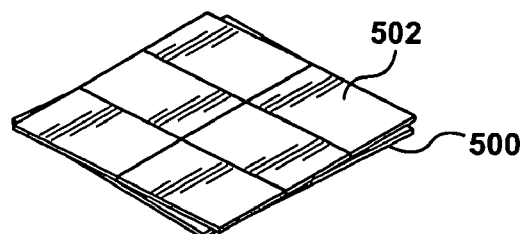
FIG. 39 is a perspective view of the sod layers of FIG. 38.

Reference is next made to FIGS. 38, 39 which show an alternative and relatively low cost way of obtaining overlap between slabs of sod stacked in successive layers on a pallet. As shown in FIGS. 38, 39, each layer 500, 502 (only two layers are shown) may be rotated slightly, typically between 5° and 10°, with respect to the layer below it. For example, the second layer 502 may be rotated 5° to 10° counterclockwise (as shown) with respect to the first layer 500. The third layer (not shown) may be aligned with the first layer 500. The fourth layer (not shown) may be aligned with the second layer 502. A 5° rotation of a sod layer that is 48" by 48" will produce approximately a two inch overlap, or overhang, as indicated at 504 in FIG. 38.

With the method of stacking shown, sufficient overlap is achieved to tie the stack together so that it is more resistant to damage when travelling. Since the amount of rotation used is small, the limited rotation needed can be achieved quickly (in much less time than that needed for a 90° rotation). In addition, since only limited rotation is used, the loaded pallet is not appreciably larger in plan view from a pallet where no overlap between successive sod layers is provided.

The rotation needed for the overlap in FIGS. 38, 39 can be achieved by any appropriate mechanism. For example, the rotate cylinder mechanism 110 of FIG. 7 can be used.

Figure 40:
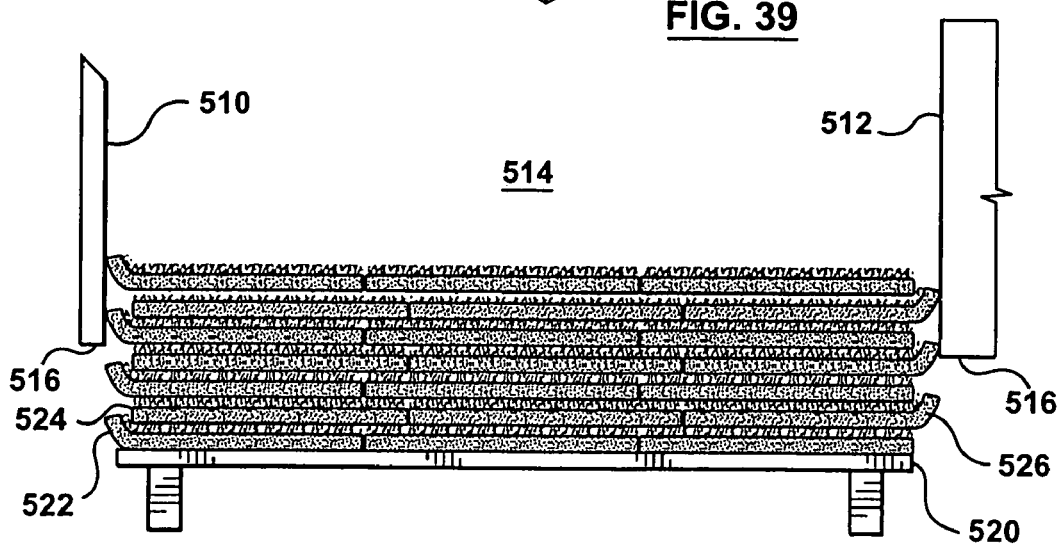
FIG. 40 is an end view of a piling cavity for stacking sod slabs, dimensioned to produce curled up edges for the sod and to produce overlap in successive layers of sod.
Figure 41:
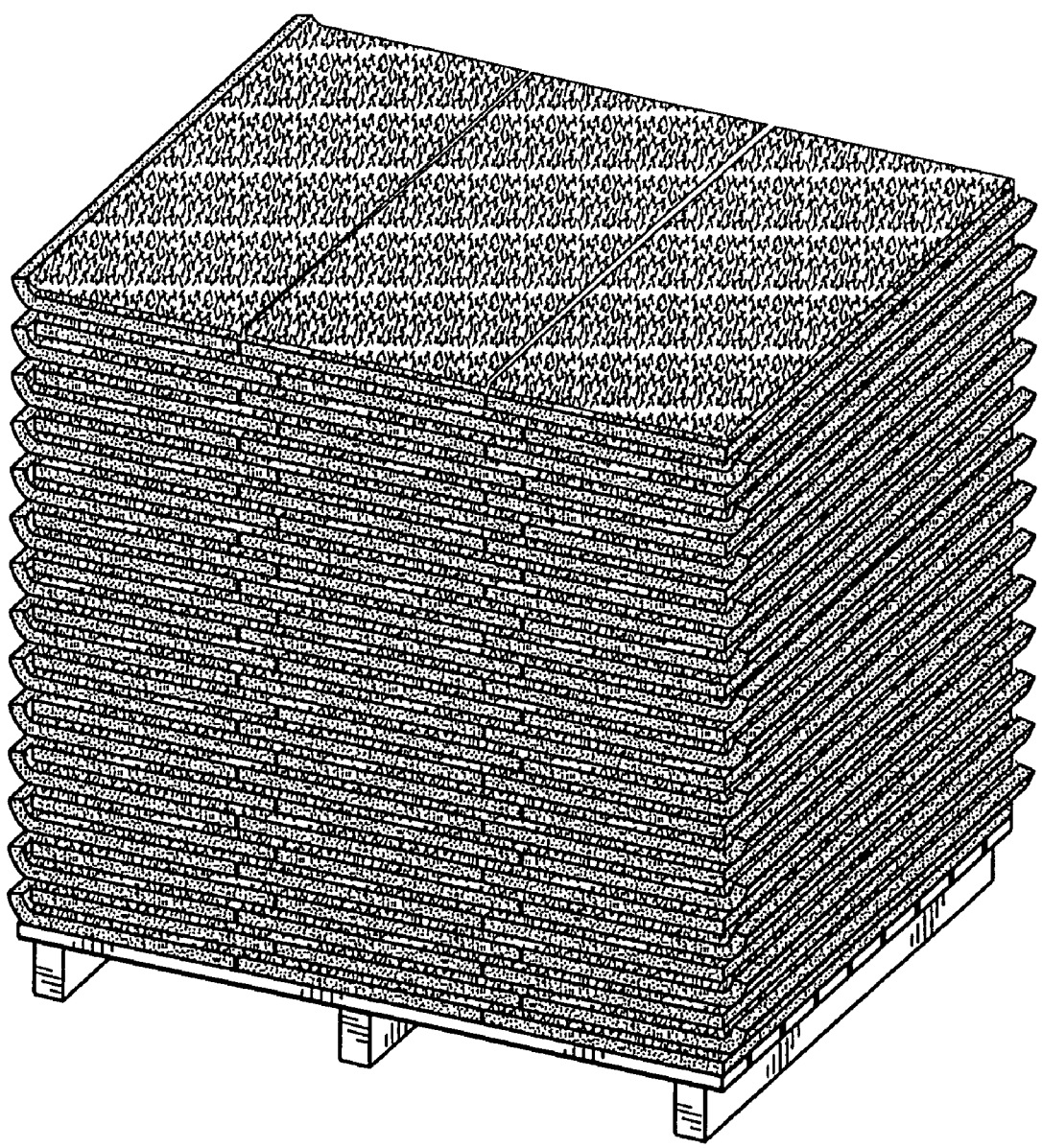
FIG. 41 is a perspective view of a stack of sod on a pallet and having curled up edges.

Reference is next made to FIGS. 40, 41, which show another way of achieving overlap between successive layers of sod slabs. As shown in FIG. 40, a pair of vertical piling walls 510, 512 are provided. The walls 510, 512 define a piling cavity 514 which accommodates a pallet 520 with very close tolerances, thus forming a "tight" piling cavity. The pallet 520 is located in cavity 514 and is initially above the bottom edges 516 of the piling walls 510, 512.

In operation, a first layer 520 (formed by three sod slabs) is deposited into the cavity 514 in a position displaced toward one of the piling walls 510, so that one edge 522 of the first sod layer is curled upwardly.

A second sod layer 524 is then deposited into the piling cavity 514 in a position such that the edge 526 of the second sod layer opposite to the edge 522 of the first sod layer is displaced toward the piling wall 512, causing the edge 526 of the second sod layer to curl upwardly. This process is continued with alternate sod layers, resulting in the stack shown in FIGS. 40, 41, in which sod layers slightly overlap the sod layers beneath them. To achieve this result, each sod layer must be moved to a sideways offset position with respect to the sod layer below it. This can be accomplished, for example, by any of the mechanisms previously described. Since the sod is not resilient, but rather is somewhat moldable, it is found, as shown in FIG. 41, that the upturned edges of the sod layers remain upturned when the pallet is removed from the cavity 514, thus helping to tie the sod stack together. An advantage of this system is, for example, that 54 inch side sod slabs can be cut (instead of the usual 48 inch slab), and yet because of these upturned edges on the pallet, they will only occupy a width of (for example) 50 inches, thus enabling storage of more sod on a pallet of given width.

Reference is next made to FIGS. 42A, 42B to FIGS. 47A, 47B, all of which show various forms of pallet which cause a concave (as viewed from above) stack of sod slabs to be formed. In FIGS. 42A, 42B, a pallet 540 is shown having a shallow V-shaped upper surface 542 (as viewed from one end of the pallet). The V-shaped upper surface 542 results from forming the pallet to be thicker at its side edges 544 than at its center 546.

When sod is stacked on the pallet 540, as shown in FIG. 48, the stack 550 of sod layers will have a concave upper surface 552, i.e. its outer edge portions will extend upwardly as well as outwardly. This acts in a manner similar to overlapping the sod slabs and thus strengthens the sod stack against falling apart during travel. Since this method does not require any side shifting or rotation of the sod slabs, the machine for stacking the sod can be simplified, although there is a cost for the special pallets.

The pallet 540-2 shown in FIGS. 43A, 43B is similar to pallet 540 shown in FIGS. 42A, 42B except that the upper surface 542-2 of the pallet 540-2 is concavely curved, rather than being V-shaped.

The pallet 540-3 shown in FIGS. 44A, 44B is simplified in that it has a flat upper surface with upwardly protruding edges 552 (which if the pallet is made of wood can be formed simply by adding an extra piece of wood or rail 554 to each side of the pallet). Provided that the pallet is no wider than the layer of sod to be deposited on it, the upwardly protruding edges 552 will cause a sod stack deposited on the pallet to have a concave upper surface, with upwardly and outwardly protruding edges, as described in connection with FIG. 48.

If desired, and as shown in FIGS. 45A, 45B, the upwardly protruding rails 554 which have been added to the side edges of the pallet can be located on all four sides of the pallet 540-4, thus making the sod stack piled on this pallet even more resistant to vibration.

FIGS. 46A, 46B show a pallet 540-5 having a concave upper surface formed from three flat sections 560, 562, 564. The outer sections 560, 564 provide openings 566 at each lower side of the pallet for a forklift.

Alternatively, the pallet 540-6 can as shown in FIGS. 47A, 47B have a V-shaped upper surface with side edges dimensioned such that the bottom center of the "V" 570 as well as the bottoms of the side edges 544-6 all rest on the ground, providing three lines of support for the pallet 540-6.

Figure 49:
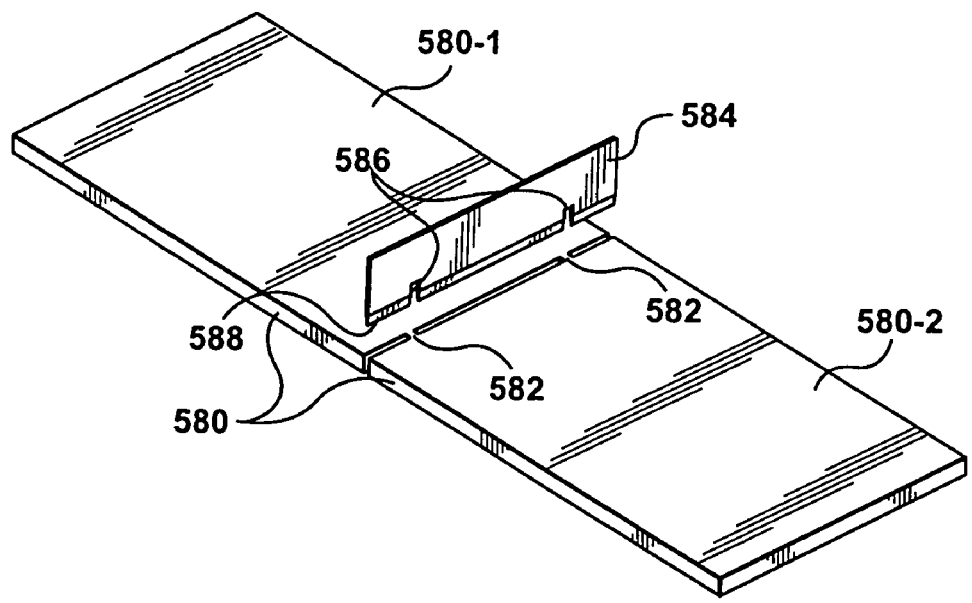
FIG. 49 is a perspective view of an elongated sod slab and a cutting knife for partially severing two portions of the sod slab.

In some cases, it may be desirable to cut an elongated slab of sod, as shown at 580 in FIG. 49, and then to cut slab 580 partially into two sections 580-1, 580-2 which are connected by small pieces of earth and root 582. The two pieces or sections 580-1, 580-2 can readily be pulled apart when the sod is to be laid, but prior to being pulled apart, the connecting portions 582 perform a function similar to overlapping, in that they tie the two pieces 580-1, 580-2 together and thus help stabilize the sod stack against falling apart during activities such as transporting the sod stack.

To perform its function of leaving the two parts of the sod slab 580 connected, the cross-cut knife 584 (which normally cross-cuts the sod while the sod is still in the ground) is provided with two notches 586, each extending from the lower edge 588 of the cutting knife 584 upwardly and having a height approximately equal to the thickness of the sod slab. The height can be slightly less than the thickness of the sod slab (which would weaken the connection) or it can be equal to or greater than the height of the sod slab, which would leave a connection of thickness equal to the full thickness of the sod slab 580.

Figure 50A:
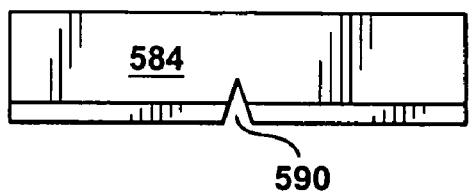
FIGS. 50A to 50E inclusive are side views of different versions of a cross-cut knife for partially severing an elongated sod slab into two partially connected sod slabs.
Figure 50B:
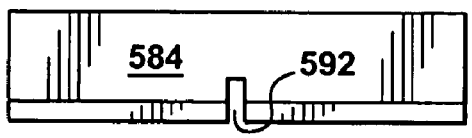
Figure 50C:
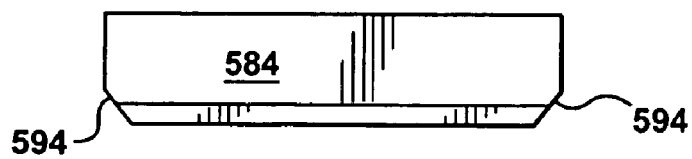

Reference is next made to FIGS. 50A, 50B, 50C, which show variations of the notches in the cross-cut knife 584. In FIG. 50A, a single V-shaped central notch 590 is provided in the bottom of the cross-cut knife 584, so that the two sections of the sod slab 580 will be connected by a single connecting portion, which can be of desired width to achieve a suitable compromise between having the two sod sections 580-1, 580-2 connected together strongly enough to resist falling apart of the sod stack, and being able to pull the two sections 580-1, 580-2 of the sod slab apart for sod laying purposes.

In FIG. 50B, a single rectangular notch 592 is provided at the center of the lower edge of the cross-cut knife 584.

In FIG. 50C, the two bottom outer corners of the cross-cut knife 584 are each bevelled or sloped, as indicated at 594, so that a connecting portion of sod slab will occur at each side of the sod slab 580. (It is assumed that the width of the sod slab, which is set by the standard side cutting knives used in sod harvesters, is equal to the width of the cut-off knife 584.)

Figure 50D:

FIG. 50D shows a cut-off knife 584 similar to that shown in FIG. 50C, but with a rectangular notch 596 at each bottom corner of the knife 584, thus also leaving a connecting portion at each side of the sod slab 580, connecting the two sections of the sod slab.

Figure 50E:
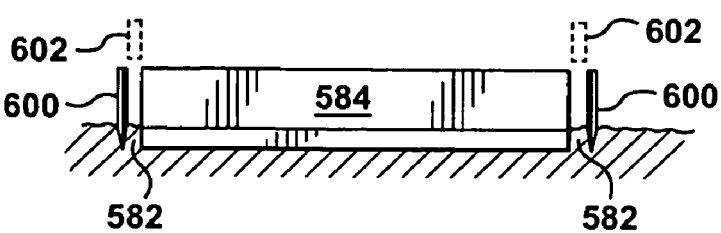

FIG. 50E shows a combination of a cross-cut knife 584, and two conventional side cutting knives 600, with the side cutting knives 600 spaced slightly outwardly laterally of the side edges of the cross-cut knife 584. In other words, the cross-cut knife 584 does not span the full width of the sod slab being cut, and thus also leaves small connecting portions 582 between adjacent sections.

It may be desired to leave the small connecting portion or portions 582 between some sod slab sections, but not others. For example, sod slab 580 may be cut into two connected portions 580-1, 580-2 as described, but it may be desired to cut the next slab (not shown) completely free of slab 580. This can be accomplished by providing additional cut-off knife sections shown in dotted lines at 602 in FIG. 50E. Knife sections 602 are normally positioned out of the gaps 582 but can be moved into gaps 582 by any desired means, to produce a full cut completely across the width of the sod slab 580.

It will be realized that sod harvesting and stacking machines of the kind described may be used to harvest sod from many different fields of sod. In some cases, it may be important not to contaminate a field containing one variety of sod with seeds and roots from a different variety of sod which was growing in a field on which the harvester was previously working. The danger of such cross-contamination between two fields of sod can be reduced by providing the harvester with an air compressor, shown for example in dotted lines at 610 in FIG. 2. The air compressor 610 is connected to one or more air hoses 612 (also shown in dotted lines in FIG. 2), and each equipped with a conventional trigger operated blowing nozzle 614. The air compressor 610 can be separately powered by its own gasoline engine, or it can be operated by a hydraulic motor on the harvester 10, or it can be operated from the powered take-off of the towing vehicle. In use, when the harvester is moving to a new field containing a different variety of sod than was previously harvested, the air compressor 610 is started and the nozzles 614 are used to clean with compressed air the parts of the harvester 10 which are most likely to carry seeds or root portions, e.g. the undercutting, side cutting and cross-cutting knives, the roller, and the sod conveyors and sod transport mechanisms.

Figure 51:
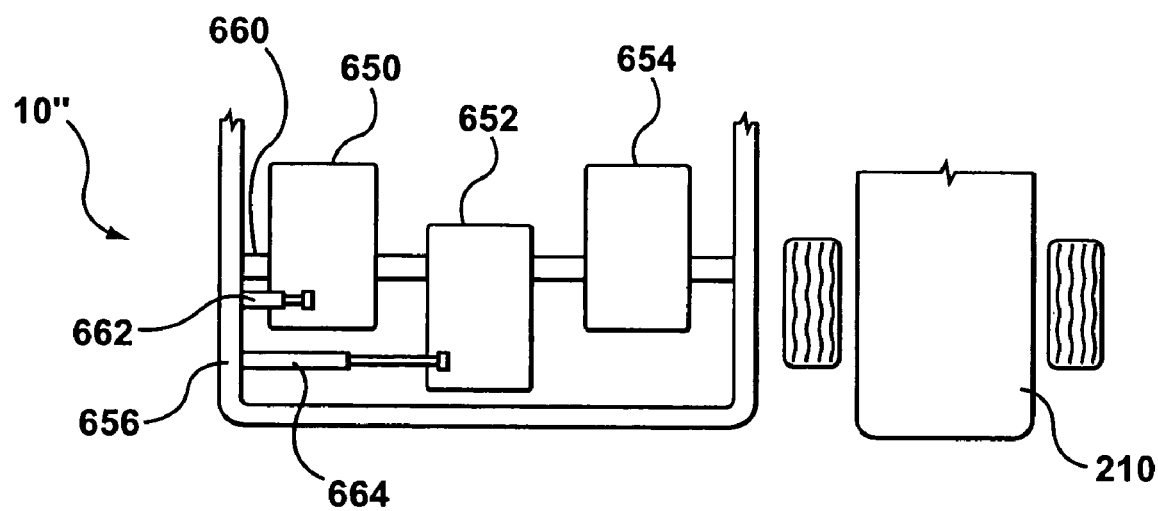
FIG. 51 is a top diagrammatic view of a portion of a harvester and showing three sod cutting heads mounted on the harvester for powered sideways movement of two of the heads.

As previously discussed in connection with FIGS. 17, 18, the harvester may have a plurality of sod cutting heads, e.g. three such heads to cut three side-by-side strips of sod. Depending on the nature of the sod, it may be desirable to leave uncut strips of sod in the field between the cut strips which have been removed. The uncut strips may need to be of various widths, depending on the nature of the sod, the soil and the growing conditions. In some cases, it may be desired not to leave any uncut strip between the cut strips, but rather to clear cut the field and then to regrow a new crop of sod by reseeding the field. To facilitate adjustment of the sod cutting heads for this purpose, for example, where three sod cutting heads 650, 652, 654 (FIG. 51) are used, two of the sod cutting heads 650, 652, 654 may be mounted for transverse sliding movement on a mounting frame 656 at the front of the harvester 10". Where the harvester 10" is mounted on the side of a tractor 210, the two movable heads can be the two outermost heads (away from the tractor), i.e. heads 650, 652. Each head 650, 652, 654 will preferably include a complete conventional sod strip cutting mechanism, including cross-cut knife, undercutting knife with side cutting blades, a hydraulic motor and mechanism to power the knives, a depth adjustment linkage, and a sod roller (all of these parts are conventional). The heads 650, 652 are both mounted for lateral sliding movement on a transverse frame 660 and can be moved laterally back and forth by pistons and cylinders diagrammatically indicated at 662, 664. In this manner, the lateral distance between the sod cutting heads 650, 652, 654 can be easily adjusted to set the width of the uncut strips between the cut sod strips. If desired, additional clamp locks (not shown) can be provided to clamp the cutting heads to the transverse frame 660 at their set positions, in case of hydraulic fluid leakage from the pistons and cylinders 662, 664.

Figure 52:
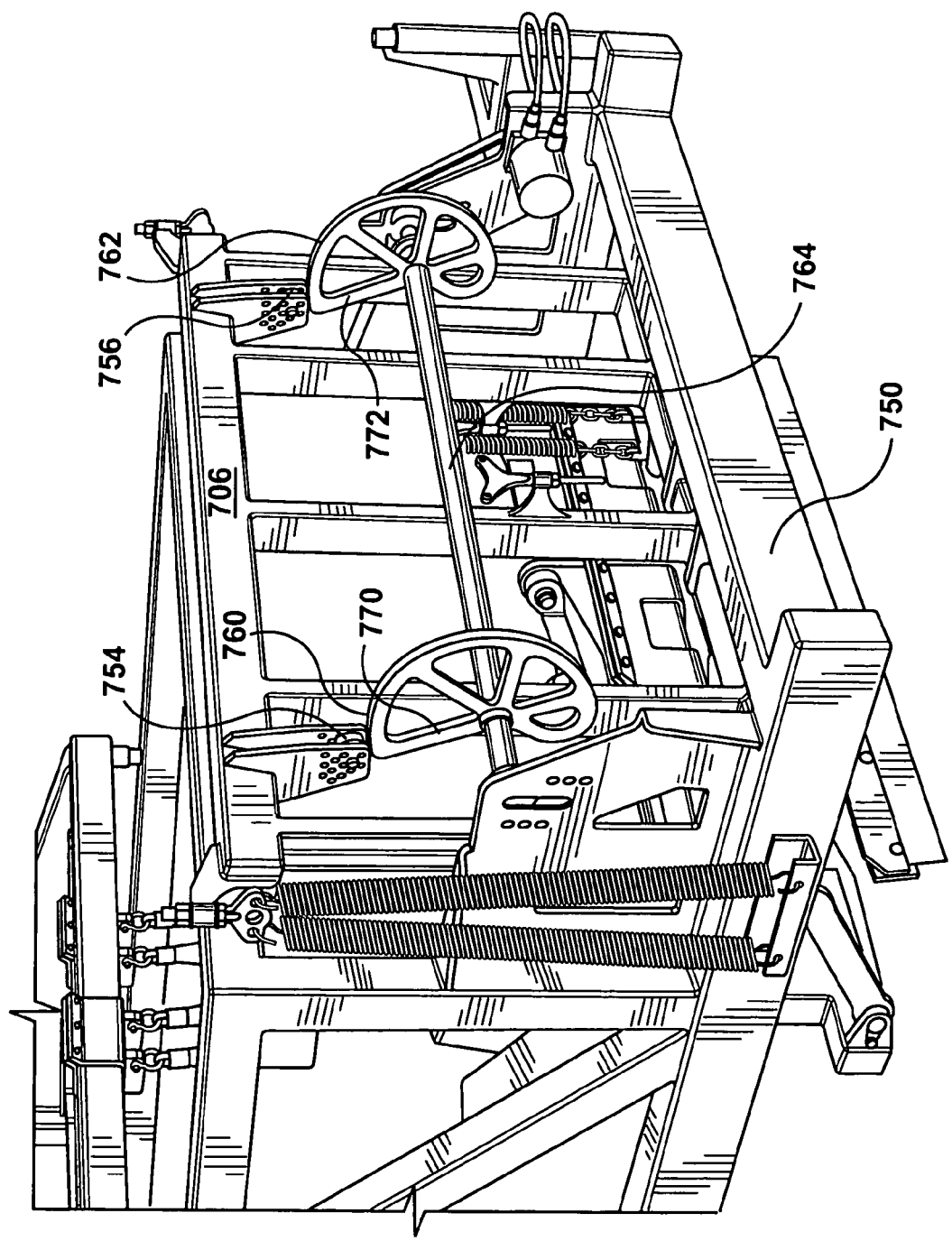
FIG. 52 is a perspective view of the front of the harvester showing a set of three cross-cut knives, each separately pivoted, for cross-cutting a wide strip of sod.
Figure 53:
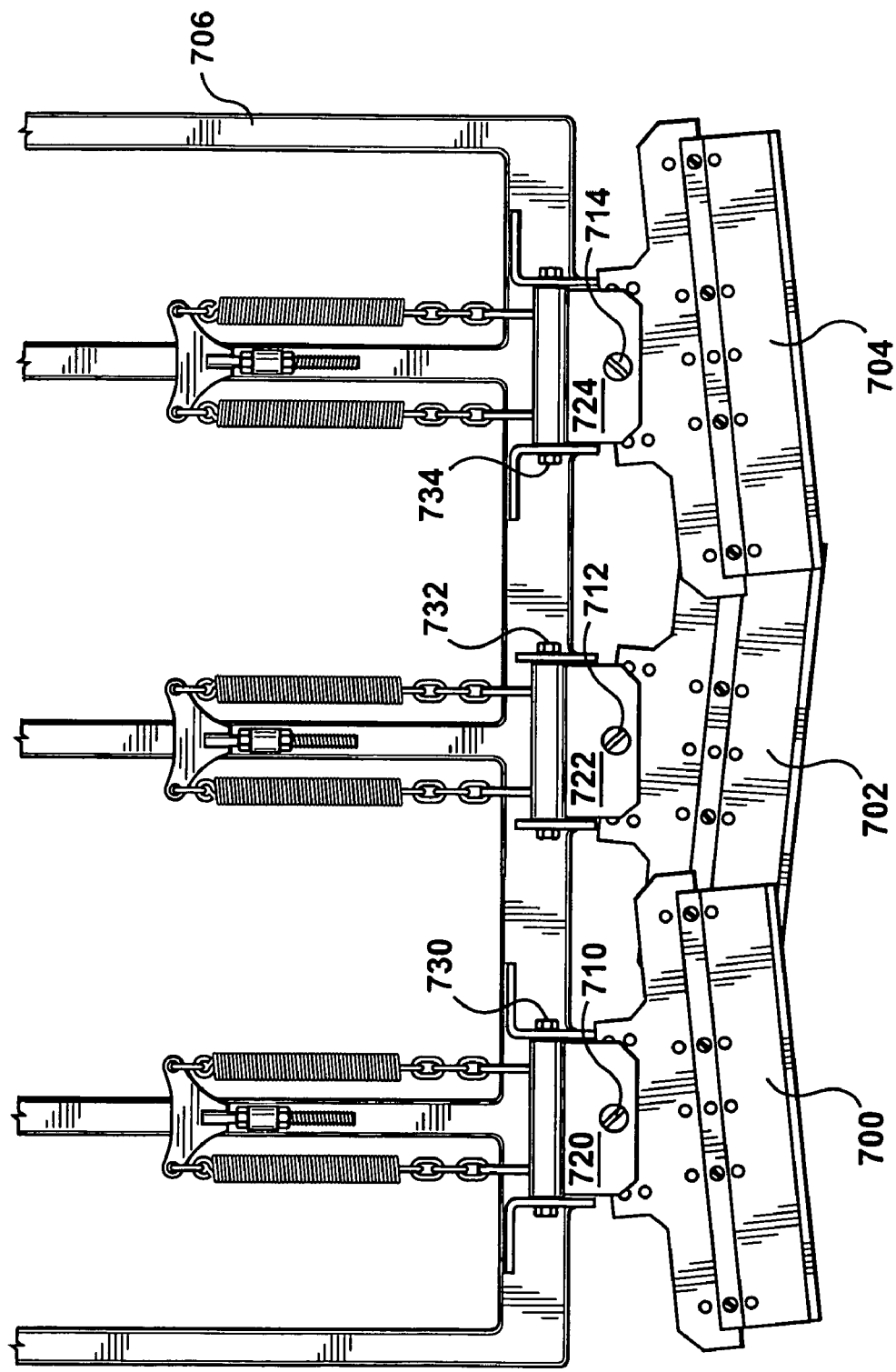
FIG. 53 is a front view of the cross-cut knives of FIG. 52.

Finally, reference is made to FIGS. 52, 53, which show a modified cross-cut blade arrangement which is suitable for use when a very wide sod slab is to be cut from the ground. When a wide sod slab is to be cut, a set of several undercutting knives may be used, one positioned beside the other, and with only the outer sod undercutting knives having side cutting blades to cut the edges of the slab. With such an arrangement, if the ground being cut is uneven, the side-by-side sod undercutting knives can adjust to the unevenness (since each is supported by a roller of relatively short lateral width). However, if a single cross-cut knife is used, and if the ground is uneven (for example, if there is a shallow V-shaped gully in the ground being cut), then the cross-cut knife will not cross-cut the full width of the sod slab uniformly and may not penetrate deeply enough into the ground at certain points. If this occurs, then the sod slabs being cut may not be sufficiently separated from each other, and this can cause serious problems during rolling or stacking.

In the arrangement shown in FIGS. 52, 53, three cross-cut knives 700, 702, 704 are mounted side-by-side on a cross-cut frame 706. Each knife 700, 702, 704 is pivotably mounted by a pivot 710, 712, 714 on a plate 720, 722, 724. The plates 720, 722, 724 are supported by further pivots 730, 732, 734 on the cross-cut frame 706.

The pivots 710, 712, 714 have axes which are generally horizontal and which are generally aligned with the path of travel of the harvester, so that the cross-cut knives can align themselves with the contours of the ground being cut. The pivots 730, 732, 734 have axes which are generally horizontal and generally transverse to the path of harvester travel, so that (as is conventional), after the cross-cut knives penetrated the ground, these knives can tilt rearwardly (as the harvester travels forwardly) until they are lifted out of the ground.

A conventional mechanism is used to operate the cross-cut knives shown. In a conventional cross-cut mechanism, the cross-cut blade is raised against the pressure of a heavy spring by a cam; then the cam suddenly removes lifting support, allowing the spring or springs to drive the cross-cut blade into the ground. A similar arrangement is used in the embodiment of FIGS. 52, 53. As shown, the cross-cut frame 706 is mounted to the main frame 750 of the harvester, with guides (not shown) constraining the cross-cut frame 706 to move vertically up and down on the harvester frame 750. As is usual for cross-cut mechanisms, leaf springs (not shown) are provided to strongly bias the cross-cut frame 706 downwardly. The cross-cut frame 706 is, however, supported by two laterally spaced cam followers 754, 756 which ride on the peripheries of a pair of cams 760, 762 mounted on a shaft 764 which is supported at its ends on the main frame 750 of the harvester. As is usual, the cams 760, 762 rotate at ground speed, periodically raising the cross-cut frame 706 and then suddenly removing lifting support from it (at the rearwardly inwardly extending sections 770, 772 of the cam profiles), thus periodically allowing the cross-cut frame to drive the cross-cut knives 710, 712, 714 into the ground to cross-cut the sod.

Figure 54:
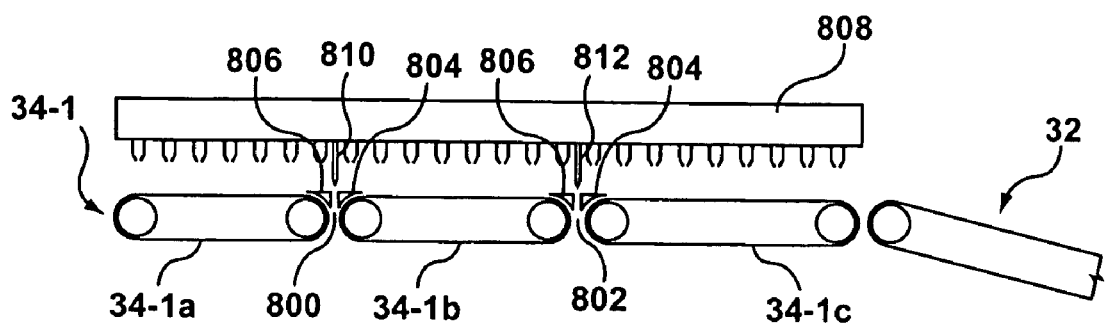
FIG. 54 is a diagrammatic side view of third set conveyors and the sod pick-up mechanism illustrating another aspect of the invention.
Figure 55:
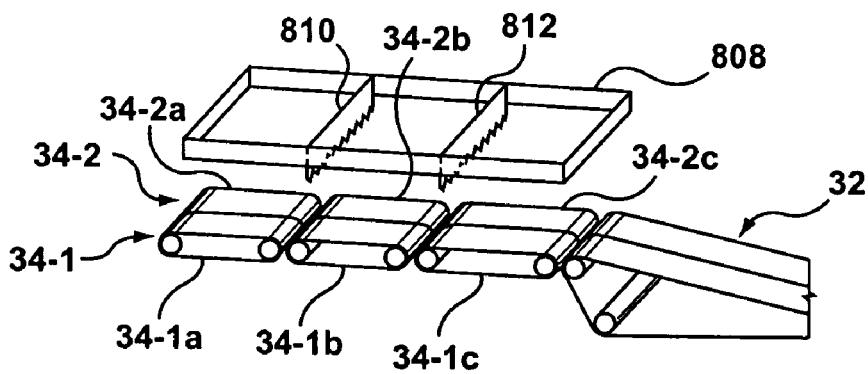
FIG. 55 is a diagrammatic perspective view of the apparatus of FIG. 54.

Reference is next made to FIGS. 54 and 55, which show another aspect of the invention. As there shown, there are two third set conveyors 34-1, 34-2. Each third set conveyor is divided into (for example) three subconveyors 34-1a, 34-1b, 34-1c, and 34-2a, 34-2b, 34-2c. The subconveyors of each third set conveyor 34-1, 34-2 are linked together by chain and sprocket mechanisms (not shown) similar to chain and sprocket mechanism 46 of FIG. 1, so that only one of the three subconveyors of each third set conveyor need be driven to drive all three subconveyors of a third set conveyor.

The division of each third set conveyor 34-1, 34-2 into three subconveyors provides two gaps or depressions 800, 802 in the top of each of these conveyors, to accommodate cross-cut knives as will be explained.

To bridge the gaps between the subconveyors of each third set conveyor 34-1, 34-2, pairs of wedge-shaped members 804 are mounted one between each adjacent pair of third set subconveyors (and are supported on the conveyor frame by means not shown). Each wedged-shaped member 804 has a slot 806 therein to accommodate the blade of a cross-cut knife (to be described).

The sod carrier 808 (which may be essentially the same as sod carrier 94 of FIGS. 1 and following) supports two cross-cut knives 810, 812, which are suspended over the slots 806 in the third set conveyors 34-1, 34-2. Thus, when the sod carrier 808 is lowered onto sod (not shown) on the third set conveyors 34-1, 34-2, the cross-cut knives 810, 812 penetrate the sod and cut it into shorter lengths. The slots 806 allow the cross-cut knives 810, 812 to penetrate fully through and slightly beyond the full thickness of the sod on the third set conveyors during the cross-cut operation. As previously described, either the sod carrier 808 can be lowered onto the sod on third set conveyors 34-1, 34-2, or the third set conveyors can be raised and pushed against the sod carrier 808, or a combination of these two operations may occur. At this time, as previously described, the third set conveyors 34-1, 34-2 are stationary (this is possible because of the wide gap between successive strips of sod; see FIG. 4c), thus allowing the sod strips on them to be cross-cut and picked up from the third set conveyors before the next set of sod strips arrives.

By way of example, the sod strip on each third set conveyor 34-1, 34-2 can be 48 inches long by 24 inches wide. When the 48 inch length is cut into three equal length pieces, each piece will be 16 inches long. Thus, after cross-cutting, each third set conveyor will carry three sod slabs, each sod slab being 16 inches by 24 inches, for a total sod dimension of 48 inches by 48 inches (divided into six easy to handle sod slabs). The entire set of six sod slabs can be picked up and deposited on a standard 48 inch by 48 inch pallet, using the sod carrier 808 in the same manner as sod carrier 94, as described previously in this application.

As another example, the sod strip on each third set conveyor can be 48 inches long by 48 inches wide, and can be cut into four 24 by 24 inch pieces. Alternatively it can be cut into six 16 by 24 inch pieces. The third set conveyors can be divided into subconveyors as needed for the dimensions selected, and the cutting knives can be positioned as needed.

If desired, the sod strip on each of the third set conveyors 34-1, 34-2 can be divided into only two pieces (as previously described), or it can be divided into more than three pieces, by using additional cross-cut knives and third set conveyor subsections (not shown).

Figure 56:
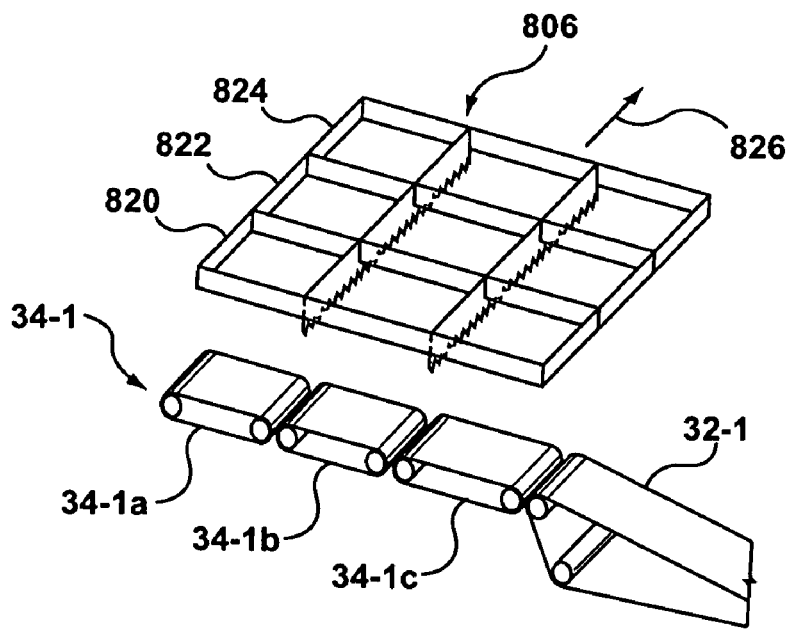
FIG. 56 is a diagrammatic perspective view of a modification of the apparatus of FIG. 55.

If the sod harvester 10 is cutting with only one cutting head 12-1, then there will be only one third set conveyor 34-1, divided (for example) into three subconveyors 34-1a, 34-1b, 34-1c. In that case, the sod carrier 808 may be divided into two or three sections across its width, with the sod gripping clamps 130 of each section being separately operable (e.g. using separate actuating cylinders) to pick up sod. The three sections are indicated at 820, 822, and 824 in FIG. 56 (with the clamp mechanisms omitted for clarity). In that case, the sod carrier 808 can be positioned with section 824 over the third set conveyors 34-1 to cross-cut and pick up a strip of sod on those conveyors. The sod carrier 808 can then be raised and moved laterally one conveyor width in the direction of arrow 826, to bring the center section 822 of the sod carrier 808 over the third set conveyor 34-1. After the next strip of sod arrives and stops on the third set conveyor 34-1, the sod carrier 808 is lowered so that its center section 822 cross cuts and picks up that strip of sod. The sod carrier 808 is then stepped once more in the direction of arrow 826 so that its third section 820 is located over the third set conveyor 34-1, ready to pick up the next sod strip which arrives and stops there. When the sod carrier 808 has been filled in this manner, it is then moved over a pallet to deposit its sod on the pallet, as previously described.

While preferred embodiments of the invention have been described, it will be appreciated that various changes can be made, and such changes are intended to be included within the appended claims.

The invention claimed is:

1. A sod harvester adapted for travel along a path of travel and comprising:
   a) a sod cutting knife for cutting pieces of sod from the ground, each piece having a leading edge and a trailing edge, said pieces of sod comprising a first sod piece and a second sod piece, said second sod piece following said first sod piece,
   b) a conveyor mechanism for carrying sod away from said cutting knife to a first location,
   c) a sod pick-up mechanism for picking up sod from said first location and for moving such sod to a second location and for then returning to said first location to again pick up sod at said first location,
   d) said conveyor mechanism including a plurality of conveyors in sequence including a first conveyor for receiving said first sod piece from said cutting knife and a second conveyor for receiving said first sod piece from said first conveyor and accelerating said first sod piece toward said first location to create a time period between the passage of the trailing edge of said first sod piece into said first location and the arrival of the leading edge of the second sod piece at said first location, e) said conveyor mechanism further including a mechanism for supporting said first sod piece in a stopped condition at said first location, while said second sod piece is moving towards said first location, f) said time period being sufficient for a said first sod piece to assume said stopped condition at said first location and for said sod pick-up mechanism to pick up and remove the stopped first sod piece from said first location before the second sod piece arrives at said first location.

2. A sod harvester according to claim 1 wherein said conveyor mechanism comprises three conveyors in sequence, namely a first conveyor, a second conveyor and a third conveyor, said first conveyor receiving sod from said cutting knife, said second conveyor receiving sod from said first conveyor, said third conveyor receiving sod from said second conveyor, wherein said third conveyor constitutes said first location.

3. A sod harvester according to claim 2 wherein said third conveyor is driven faster than said second conveyor.

4. A harvester according to claim 3 and being adapted to travel over the ground at a ground speed while harvesting, and wherein said first conveyor is driven at a speed which is equal to or slightly greater than said ground speed, said second conveyor is driven at a speed which is approximately double said ground speed, and said third conveyor is driven at a speed which is approximately three times said ground speed.

5. A sod harvester according to claim 2 and having a plurality of cutting knives located side-by-side to cut a plurality of side-by-side sod pieces.

6. A sod harvester according to claim 5 wherein there are three sod cutting knives, namely, a center sod cutting knife and two outer sod cutting knives one on each side of said center sod cutting knife, and wherein said center sod cutting knife is offset along said path of travel from said outer sod cutting knives.

7. A sod harvester according to claim 6 wherein said center sod cutting knife is offset forwardly along said path of travel with respect to said outer sod cutting knives.

8. A sod harvester according to claim 2 and including a pallet support beside said third conveyor for supporting a pallet, said pallet support constituting said second location, a gantry guide structure mounted over said pallet support and said third conveyor, a gantry mounted on said gantry guide structure for movement back and forth over said first and second locations, and a sod pick-up carrier mounted on said gantry for picking up sod from said first location and releasing said sod at said second location.

9. A sod harvester according to claim 8 wherein said sod pick-up carrier includes clamps for clamping an upper portion of said sod to pick up said sod and for releasing said upper portion to release said sod at said second location.

10. A sod harvester according to claim 9 wherein said third conveyor is mounted on a third conveyor bed, and including a mechanism for raising said third conveyor toward and pressing it against said clamps so that said clamps can grip sod on said third conveyor, and for then lowering said third conveyor for said third conveyor to receive new sod.

11. A sod harvester according to claim 10 and including a knife mounted in said sod carrier for cutting said sod on said third conveyor when said third conveyor is pressed against said sod carrier.

12. A sod harvester according to claim 8 wherein said sod carrier is mounted for rotary movement on said gantry, said harvester including a control circuit for rotating said sod carrier through 90° at selected times after said sod carrier has picked up sod, thereby to tie together pieces of sod stacked on a pallet.

13. A sod harvester according to claim 8 wherein said sod pickup carrier is mounted on said gantry for limited tilting with respect to said gantry, thereby to provide at least some compensation for uneven thickness of sod on said third conveyor.

14. A sod harvester according to claim 1 and including a forklift for supporting a pallet on which sod is to be stacked, and further including a control circuit for lowering said pallet by approximately the thickness of said sod after a piece of said sod has been deposited on said pallet.

15. A sod harvester according to claim 1 and adapted to be mounted on the side of a tractor, said tractor having rear wheels having an axis, said harvester including at least one support wheel mounted behind said sod cutting knife for supporting a portion of the weight of said harvester, said support wheel having an axis aligned in a front to rear direction with said axis of said wheels of said tractor, a suspension connecting said support wheel to said harvester, said suspension permitting upward and downward movement of said support wheel as said harvester travels over undulating ground.

16. A sod harvester according to claim 15 wherein said suspension includes a piston and cylinder, and a control for controlling the pressure in said piston and cylinder to adjust the portion of weight of said harvester which is supported by said rear wheel.

17. A sod harvester adapted for travel along a path of travel and further adapted to be mounted on the side of a tractor, said tractor having rear wheels having an axis, said sod harvester comprising a sod cutting knife for cutting pieces of sod from the ground, a conveyor mechanism for carrying sod rearwardly from said sod cutting knife, and a support wheel located behind said cutting knife to support a portion of the weight of said harvester, said support wheel having an axis aligned in a front to rear direction with said axis of said tractor rear wheels, said support wheel including a suspension mounting said support wheel to said harvester, said suspension including a first piston and first cylinder connected to said harvester and acting to control the proportion of the weight of the harvester placed on said support wheel.

18. A sod harvester according to claim 17 and further including a rear rolling support located behind said support wheel, said rear rolling support being connected to said harvester by a movable linkage, and a second piston and second cylinder connected between said movable linkage and said harvester to control the proportion of the weight of said harvester supported by said rear rolling support.

19. A method of harvesting sod using a sod harvester adapted for travel along a path of travel, said sod harvester having a sod cutting knife for cutting pieces of sod from the ground and a conveyor mechanism for carrying sod away from said cutting knife to a first location, said method comprising:

a) continuously cutting said pieces of sod, each piece having a leading edge and a trailing edge, said pieces of sod comprising a first sod piece and a second sod piece, said second sod piece following said first sod piece, b) using said conveyor mechanism to convey said pieces of sod sequentially away from said cutting knife to a first location, c) while conveying said first and second sod pieces toward said first location, accelerating said first sod piece toward said first location and away from the second sod piece to create a time interval between the passage of the trailing edge of the first sod piece into said first location and the arrival of the leading edge of the second sod piece at said first location, d) stopping said first sod piece at said first location and supporting said first sod piece on said conveyor mechanism, e) while said first sod piece is stopped at said first location, picking up the first sod piece with a sod pick up mechanism and then moving the first sod piece to a second location and then returning said sod pick up mechanism to said first location to pick up the second sod piece at said first location, f) the steps of stopping said first sod piece at said first location and picking up said first sod piece therefrom being performed in said time interval.

20. A method according to claim 19 wherein said sod piece at said first location is on a conveyor, and wherein the step of picking up said sod piece is performed by a sod carrier, the step of picking up said sod piece including pressing one of said conveyor and said sod carrier toward the other of said conveyor and sod carrier.

* * * * *